US012726959B2

(12) United States Patent
Miao et al.

(10) Patent No.: US 12,726,959 B2
(45) Date of Patent: Sep. 1, 2026

(54) METHOD, DEVICE AND COMPUTER READABLE MEDIUM FOR COMMUNICATIONS

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 18/294,918

(22) PCT Filed: Aug. 3, 2021

(86) PCT No.: PCT/CN2021/110383
§ 371 (c)(1),
(2) Date: Feb. 2, 2024

(87) PCT Pub. No.: WO2023/010289
PCT Pub. Date: Feb. 9, 2023

(65) Prior Publication Data

US 2024/0340871 A1 Oct. 10, 2024

(51) Int. Cl.
*H04W 72/0453* (2023.01)
*H04W 76/27* (2018.01)

(52) U.S. Cl.
CPC ....... *H04W 72/0453* (2013.01); *H04W 76/27* (2018.02)

(58) Field of Classification Search
CPC .............. H04W 72/0453; H04W 76/27; H04L 5/0044; H04L 5/0007
See application file for complete search history.

(56) References Cited

U.S. PATENT DOCUMENTS 12,382,437 B2 * 8/2025 Bang ................. H04W 72/1268
2014/0036803 A1 * 2/2014 Park ...................... H04W 72/23 370/329
2021/0091901 A1 3/2021 Sun et al.
2021/0092783 A1 3/2021 Sun et al.
2021/0136732 A1 5/2021 Fakoorian et al.
2021/0337518 A1 * 10/2021 Liu ....................... H04L 5/0053
(Continued)

FOREIGN PATENT DOCUMENTS

CN 110720193 A 1/2020
JP 2024-514904 A 4/2024
(Continued)

OTHER PUBLICATIONS

JP Official Communication for JP Application No. 2024-506745, mailed on Feb. 12, 2025 with English Translation.
(Continued)

*Primary Examiner* — Gbemileke J Onamuti
(74) *Attorney, Agent, or Firm* — Sughrue Mion, PLLC

(57) ABSTRACT

Embodiments of the present disclosure relate to methods, devices and computer readable media for communications. A method comprises determining, at a first terminal device, at least one sub-channel based on a size of data to be transmitted. Each of the at least one sub-channel comprises at least one frequency interlace. The method also comprises transmitting, to a second terminal device, the data and control information associated with the data on the at least one sub-channel via a sidelink between the first terminal device and the second terminal device.

18 Claims, 24 Drawing Sheets

(56) References Cited

U.S. PATENT DOCUMENTS

2023/0028000 A1* 1/2023 Si .......................... H04L 5/0094
2024/0040595 A1 2/2024 Peng et al.

FOREIGN PATENT DOCUMENTS

WO 2020/205741 A1 10/2020
WO 2020/261515 A1 12/2020
WO 2023/003221 A1 1/2023

OTHER PUBLICATIONS

Samsung, "Details on resource pool design", 3GPP TSG-RAN WG#85 R1-164761, May 14, 2016, pp. 1-5.
Nokia, Nokia Shanghai Bell, "Discussion of physical layer structure for sidelink", 3GPP Tsg Ran WG1 #99 R1-1911952, Nov. 9, 2019.
Extended European Search Report for EP Application No. 21952198.6, dated on Mar. 28, 2025.
International Search Report for PCT/CN2021/110383 dated Apr. 7, 2022.
Written Opinion for PCT/CN2021/110383 dated Apr. 7, 2022.

* cited by examiner

INTERLACES #0, #1, #2

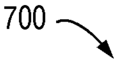

710

DETERMINE AT LEAST ONE SUB-CHANNEL BASED ON A SIZE OF DATA TO BE TRANSMITTED, EACH OF THE AT LEAST ONE SUB-CHANNEL COMPRISING AT LEAST ONE FREQUENCY INTERLACE

720

TRANSMIT, TO A SECOND TERMINAL DEVICE, THE DATA AND CONTROL INFORMATION ASSOCIATED WITH THE DATA ON THE AT LEAST ONE SUB-CHANNEL VIA A SIDELINK BETWEEN THE FIRST TERMINAL DEVICE AND THE SECOND TERMINAL DEVICE

Fig. 7

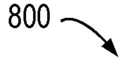

810

RECEIVE, FROM A FIRST TERMINAL DEVICE, CONTROL INFORMATION ASSOCIATED WITH DATA ON AT LEAST ONE SUB-CHANNEL VIA A SIDELINK BETWEEN THE FIRST TERMINAL DEVICE AND THE SECOND TERMINAL DEVICE

820

RECEIVE THE DATA FROM THE FIRST TERMINAL DEVICE ON THE AT LEAST ONE SUB-CHANNEL IF THE CONTROL INFORMATION IS SUCCESSFULLY DECODED ON ONE OF THE AT LEAST ONE SUB-CHANNEL

Fig. 8

METHOD, DEVICE AND COMPUTER READABLE MEDIUM FOR COMMUNICATIONS

CROSS REFERENCE TO RELATED APPLICATIONS

This application is a National Stage of International Application No. PCT/CN2021/110383 filed Aug. 3, 2021.

TECHNICAL FIELD

Embodiments of the present disclosure generally relate to the field of telecommunication, and in particular, to methods, devices and computer readable media for sidelink communication.

BACKGROUND

Sidelink on unlicensed spectrum (SL-U) is a key topic in Release 18 of the 3rd Generation Partnership Project (3GPP). SL-U may be based on New Radio (NR) sidelink and NR-U. In the NR sidelink, a structure of Physical Sidelink Control Channel (PSCCH) with consecutive Physical Resource blocks (PRBs) is employed. However, considering occupied channel bandwidth (OCB) requirement in SL-U, the structure for NR sidelink cannot work in SL-U.

SUMMARY

In general, example embodiments of the present disclosure provide methods, devices and computer readable media for communications.

In a first aspect, there is provided a method for communications. The method comprises: determining, at a first terminal device, at least one sub-channel based on a size of data to be transmitted, each of the at least one sub-channel comprising at least one frequency interlace; and transmitting, to a second terminal device, the data and control information associated with the data on the at least one sub-channel via a sidelink between the first terminal device and the second terminal device.

In a second aspect, there is provided a method for communications. The method comprises: receiving, at a second terminal device from a first terminal device, control information associated with data on at least one sub-channel via a sidelink between the first terminal device and the second terminal device; and in response to a success of decoding of the control information on one of the at least one sub-channel, receiving the data from the first terminal device on the at least one sub-channel.

In a third aspect, there is provided a method performed by a network device. The method comprises: determining a configuration for resources in a shared radio frequency band for sidelink communication between a first terminal device and a second terminal device, wherein the resources comprise at least one sub-channel and each sub-channel comprises at least one frequency interlace; and transmitting, to the first terminal device, the configuration.

In a fourth aspect, there is provided a method performed by a first terminal device. The method comprises: receiving, from a network device, a configuration for resources in a shared radio frequency band for sidelink communication between a first terminal device and a second terminal device, wherein the resources comprises at least one sub-channel and each sub-channel comprises at least one frequency interlace; and performing, with the second terminal device, the sidelink communication using the resources.

In a fifth aspect, there is provided a terminal device. The terminal device comprises a processor and a memory storing instructions. The memory and the instructions are configured, with the processor, to cause the terminal device to perform the method according to the first aspect.

In a sixth aspect, there is provided a terminal device. The terminal device comprises a processor and a memory storing instructions. The memory and the instructions are configured, with the processor, to cause the terminal device to perform the method according to the second aspect.

In a seventh aspect, there is provided a network device. The network device comprises a processor and a memory storing instructions. The memory and the instructions are configured, with the processor, to cause the network device to perform the method according to the third aspect.

In an eighth aspect, there is provided a terminal device. The terminal device comprises a processor and a memory storing instructions. The memory and the instructions are configured, with the processor, to cause the terminal device to perform the method according to the fourth aspect.

In a ninth aspect, there is provided a computer readable medium having instructions stored thereon. The instructions, when executed on at least one processor of a device, cause the device to perform the method according to the first aspect.

In a ten aspect, there is provided a computer readable medium having instructions stored thereon. The instructions, when executed on at least one processor of a device, cause the device to perform the method according to the second aspect.

In an eleventh aspect, there is provided a computer readable medium having instructions stored thereon. The instructions, when executed on at least one processor of a device, cause the device to perform the method according to the third aspect.

In a twelfth aspect, there is provided a computer readable medium having instructions stored thereon. The instructions, when executed on at least one processor of a device, cause the device to perform the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates a flowchart of an example method in accordance with some embodiments of the present disclosure;

FIG. 8 illustrates a flowchart of an example method in accordance with some other embodiments of the present disclosure;

Throughout the drawings, the same or similar reference numerals represent the same or similar element.

DETAILED DESCRIPTION

Figure 1:
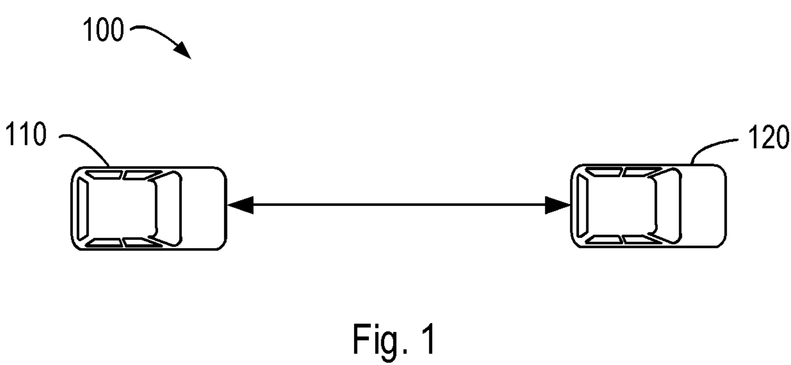
FIG. 1 illustrates an example communication network in which implementations of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

As used herein, the term "the sub-channel" refers to a frequency resource unit for resource selection, scheduling and sensing. The sub-channel comprises at least one frequency interlace. It will be understood that the frequency resource unit comprising the at least one frequency interlace may be named otherwise. The scope of the present disclosure is not limited thereto.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, SL-U may be based on NR sidelink and NR-U. In NR-U, for interlace transmission of at least Physical Uplink Shared Channel (PUSCH) and Physical Uplink Control Channel (PUCCH), the following PRB-based interlace designs is supported for the case of 20 MHz carrier bandwidth. For 15 KHz sub-carrier space (SCS), there may be 10 interlaces with 10 or 11 PRBs in each of the interlaces. For 30 KHz SCS, there may be 5 interlaces with 10 or 11 PRBs in each of the interlaces.

The following agreement on interlace indication for PUSCH for 15 kHz SCS is achieved: X=6 bits are supported to indicate start interlace index and number of consecutive interlace indices by using Resource Indication Value (RIV) and using remaining up to 9 RIV values to indicate specific pre-defined interlace combinations.

Specifically, RIV values from 0 to 54 indicate start interlace index and number of consecutive interlace indices and RIV values from 55 to 63 indicate interlace combinations as shown in Table 1.

TABLE 1

| RIV | Interlace Indexes |
|---|---|
| 55 | 0, 5 |
| 56 | 0, 1, 5, 6 |
| 57 | 1, 6 |
| 58 | 1, 2, 3, 4, 6, 7, 8, 9 |
| 59 | 2, 7 |
| 60 | 2, 3, 4, 7, 8, 9 |
| 61 | 3, 8 |
| 62 | 4, 9 |
| 63 | Reserved |

For interlaced PUSCH transmission in a Band Width Part (BWP), Y bits of the frequency domain resource allocation (FDRA) field indicate which RB sets (corresponding to Listen Before Talk (LBT) bandwidths) are allocated to a terminal device.

The terminal device may determine the overall PUSCH frequency domain resource allocation by the intersection of the following:

- allocated interlaces (indicated by X bits of the FDRA field);
- available PRBs derived at least from the allocated RB sets (indicated by Y bits of the FDRA field) and intra-carrier guard bands between RB sets corresponding to consecutive LBT bandwidths.

It should be noted that an RB set contains PRBs within an LBT bandwidth and does not include any inter or intra carrier guard can intra-carrier guard.

Y is determined by the number of RB sets contained in the BWP. The Y bits indicate a first RB set and a number of RB sets corresponding to consecutive LBT bandwidths.

It should be noted that the maximum possible value of Y is thus $$\left\lceil \log_2\left(\frac{N(N+1)}{2}\right)\right\rceil$$

where N is the number of RB sets contained in the BWP.

In NR sidelink, the terminal device may perform the following procedure for transmitting PSCCH. A terminal device may be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

In view of the above, considering OCB requirement in SL-U, a structure of PSCCH with consecutive PRBs for NR sidelink cannot work in SL-U.

Embodiments of the present disclosure provide a solution for sidelink transmission so as to solve the above problems and one or more of other potential problems. According to the solution, a first terminal device determines at least one sub-channel based on a size of data to be transmitted. Each of the at least one sub-channel comprises at least one frequency interlace. In turn, the first terminal device transmits, to a second terminal device, the data and control information associated with the data on the at least one sub-channel via a sidelink between the first terminal device and the second terminal device. This solution may facilitate blind decoding of sidelink signal in unlicensed band. In addition, this solution may solve the issue of lack of resources for PSCCH or PSSCH.

FIG. 1 illustrates a schematic diagram of an example communication network 100 in which embodiments of the present disclosure can be implemented. As shown in FIG. 1, the communication network 100 may include a first terminal device 110 and a second terminal device 120. It should be understood that the communication network 100 may further include a network device (not shown). The network device may communicate with the first terminal device 110 and the second terminal device 120 via respective wireless communication channels. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

In FIG. 1, the first terminal device 110 and the second terminal device 120 are shown as vehicles which enable V2X communications. It is to be understood that embodiments of the present disclosure are also applicable to other terminal devices than vehicles, such as mobile phones, sensors, head-mounted devices, XR devices, VR devices and so on.

The first terminal device 110 determines at least one sub-channel based on a size of data to be transmitted. Each of the at least one sub-channel comprises at least one frequency interlace. In turn, the first terminal device 110 transmits, to the second terminal device 120, the data and control information associated with the data on the at least one sub-channel via a sidelink between the first terminal device 110 and the second terminal device 120.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA). Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G), the fifth generation advanced (5G-A), the sixth generation (6G) communication protocols.

Figure 2:
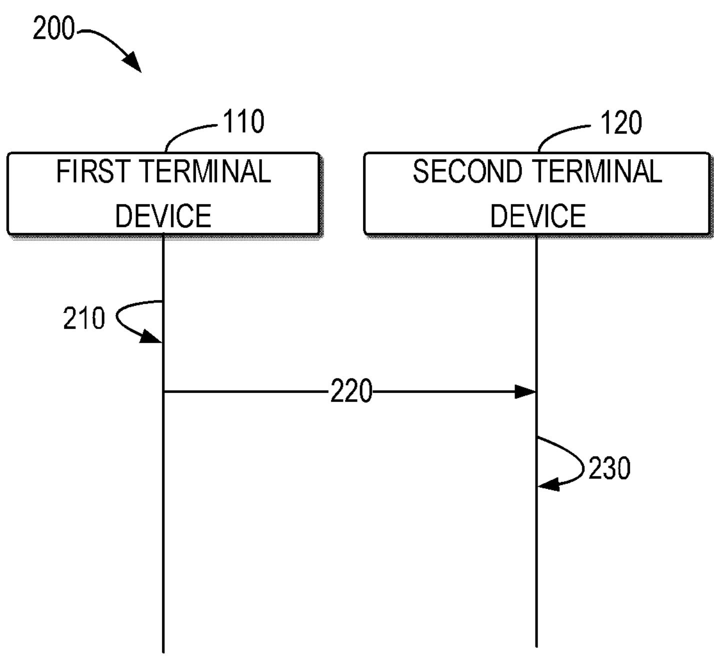
FIG. 2 illustrates an example signaling chart showing an example process for sidelink transmission in accordance with some embodiments of the present disclosure.

FIG. 2 illustrates an example signaling chart showing an example process 200 for resource selection in accordance with some embodiments of the present disclosure. As shown in FIG. 2, the process 200 may involve the first terminal device 110 and the second terminal device 120 as shown in FIG. 1. It is to be understood that the process 200 may include additional acts not shown and/or may omit some acts as shown, and the scope of the present disclosure is not limited in this regard. In addition, it will be appreciated that, although primarily presented herein as being performed serially, at least a portion of the acts of the process 200 may be performed contemporaneously or in a different order than that presented in FIG. 2.

As shown in FIG. 2, the first terminal device 110 determines (210) at least one sub-channel based on a size of data to be transmitted. Each of the at least one sub-channel comprises at least one frequency interlace. Hereinafter, for the purpose of discussion, the "frequency interlace" may be also referred to as "interlace".

In turn, the first terminal device 110 transmits (220), to the second terminal device 120, the data and control information associated with the data on the at least one sub-channel via a sidelink between the first terminal device 110 and the second terminal device 120.

In some embodiments, the first terminal device 110 may transmit the data to the second terminal device 120 on PSSCH.

In some embodiments, the first terminal device 110 may transmit the control information associated with the data to the second terminal device 120 on PSCCH.

Accordingly, the second terminal device 120 receives, from the first device 110, the control information associated with the data on at least one sub-channel via the sidelink between the first terminal device 110 and the second terminal device 120.

In turn, the second terminal device 120 decodes (230) the control information on one of the at least one sub-channel. If the second terminal device 120 successfully decodes the control information on one of the at least one sub-channel, the second terminal device 120 may determine that the data on the at least one sub-channel is for the second terminal device 120. The second terminal device 120 receives the data based on the control information on the at least one sub-channel.

In some embodiments, the number of the at least one interlace in each of the at least one sub-channel may be configured or pre-configured. For example, the first terminal device 110 and the second terminal device 120 may be configured with the number of the at least one interlace (which is represented by N), by a Radio Resource Control (RRC) parameter sl-u-SubchannelSize.

In other embodiments, the number of the at least one interlace in each of the at least one sub-channel may be determined based on a size of resources in frequency domain for transmit the control information. For example, the first terminal device 110 and the second terminal device 120 may be configured with the size of resources in frequency domain for transmit the control information, by an RRC parameter sl-u-Pscch. N may be the minum number of interlaces which contains total PRBs larger than sl-u-Pscch. For example. N=1 if sl-u-Pscch<=10; N=2 if 10<sl-u-Pscch<=20; N=3 if 20<sl-u-Pscch<=30, and so on.

In some embodiments, each of the at least one sub-channel may comprise a plurality of consecutive interlace. The plurality of consecutive interlace may start from a starting interlace.

In other embodiments, each of the at least one sub-channel may comprise a plurality of non-consecutive interlace, and a gap among the at least one interlace may be configured or pre-configured. For example, the first terminal device 110 and the second terminal device 120 may be configured with the gap by an RRC parameter sl-u-SubchannelsGap.

In some embodiments, each of the at least one sub-channel comprises the at least one frequency interlace in a single Resource Block (RB) set. This will be described with reference to FIGS. 3A, 3B, and 3C.

Figure 3A:
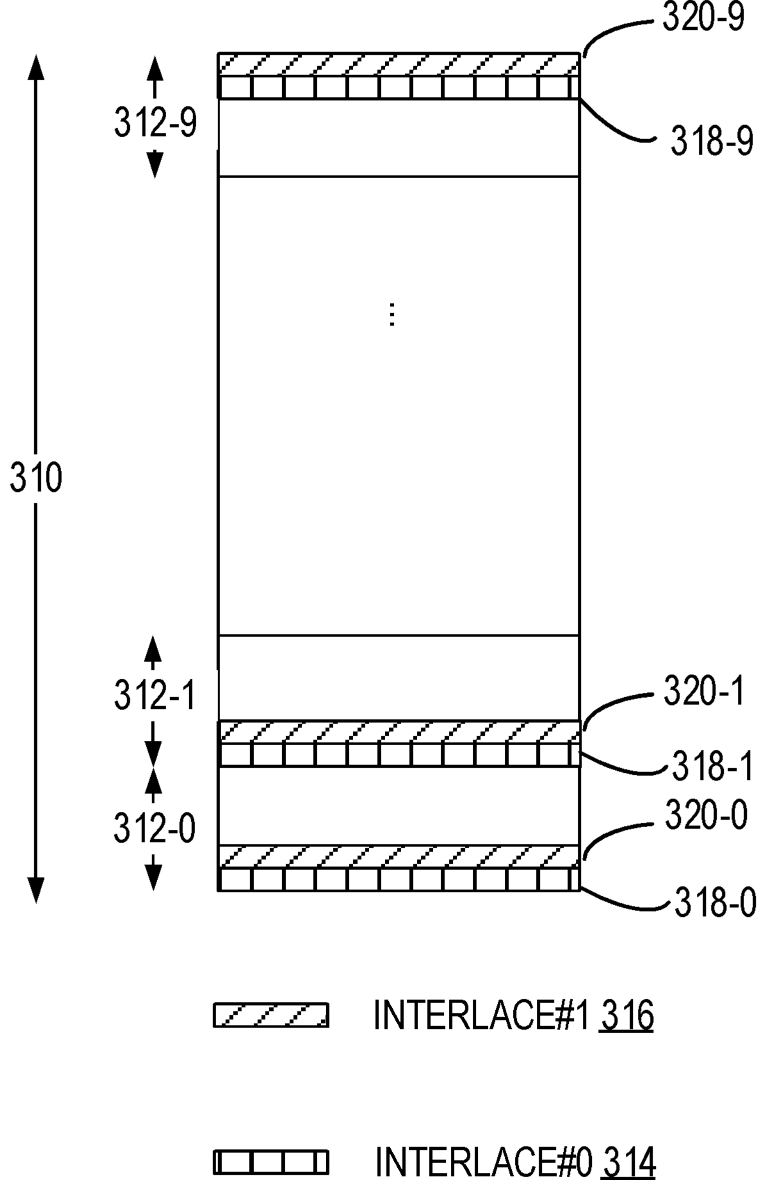
FIG. 3A illustrates an example of interlaces in accordance with some embodiments of the present disclosure.

FIG. 3A illustrates an example of interlaces in accordance with some embodiments of the present disclosure. As shown in FIG. 3A, an RB set 310 comprises a plurality of clusters of RBs. Each of the clusters comprises a plurality of equally spaced RBs. An interlace comprises RBs from the clusters. The number of the clusters or interlaces may be dependent on the amount of frequency distribution required to maintain a certain BW occupancy.

In an example, the RB set 310 may have a bandwidth of about 20 MHz and each subcarrier may span about 15 kHz in frequency. In such an example, a bandwidth of LBT is also 20 MHz.

In such an example, the RB set 310 may comprise ten clusters of RBs. i.e., 312-0, 312-1, . . . , 312-9. Each of the clusters may comprise ten or eleven RBs. Each of interlaces may comprise ten or eleven RBs.

It may be understood that an index of a starting interlace among interlaces may be defined in any appropriate manner. For example, the index of the starting interlace may be 0 as used in FIGS. 3A-3C and 4A-4C. Alternatively, the index of the starting interlace may be 1 as used in FIGS. 5A-5G and 6A-6G.

As shown in FIG. 3A, an interlace 314 having an index of 0 (which is also referred to as interlace #0 314) comprises RBs 318-0, 318-1, . . . , 318-9 from the clusters 312-0, 312-1, . . . , 312-9, respectively. An interlace 316 having an index of 1 (which is also referred to as interlace #1 316) comprises RBs 320-0, 320-1, . . . , 320-9 from the clusters 312-0, 312-1, . . . , 312-9, respectively.

In another example, the RB set 310 may have a bandwidth of about 20 MHz and each subcarrier may span about 30 kHz in frequency. In such an example, the RB set 310 may comprise about five clusters of RBs (not shown). Each of the clusters may comprise ten or eleven RBs.

Figure 3B:
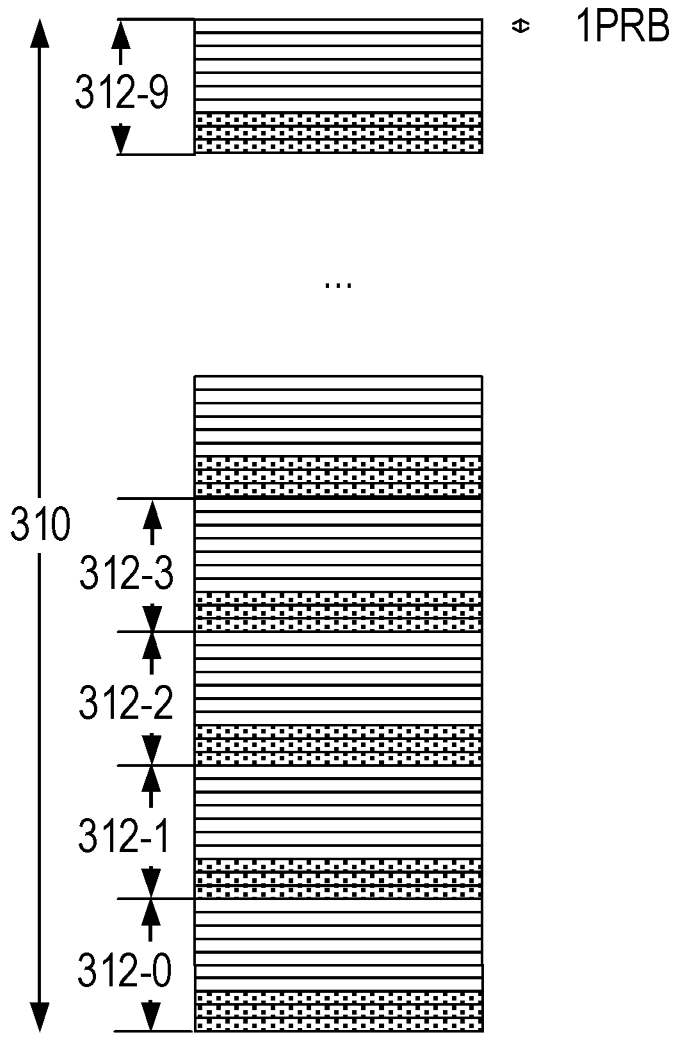
FIGS. 3B and 3C illustrate an example of a sub-channel in accordance with some embodiments of the present disclosure, respectively.

FIG. 3B illustrates an example of a sub-channel in accordance with some embodiments of the present disclosure. In the example of FIG. 3B, each of the at least one sub-channel may comprise a plurality of consecutive interlace. The plurality of consecutive interlace may start from a starting interlace.

As shown in FIG. 3B, the RB set 310 may have a bandwidth of about 20 MHz and each subcarrier may span about 15 kHz in frequency. In such an example, a bandwidth of LBT is also 20 MHZ. The RB set 310 comprises ten clusters of RBs, i.e., 312-0, 312-1, 312-2, 312-3, . . . , 312-9. Each of the clusters may comprise ten or eleven RBs. Each of interlaces may comprise ten or eleven RBs. Each of sub-channels comprises three consecutive interlaces which having indices of 0, 1, 2 (also referred to as interlaces #0, #1, #2).

Figure 3C:
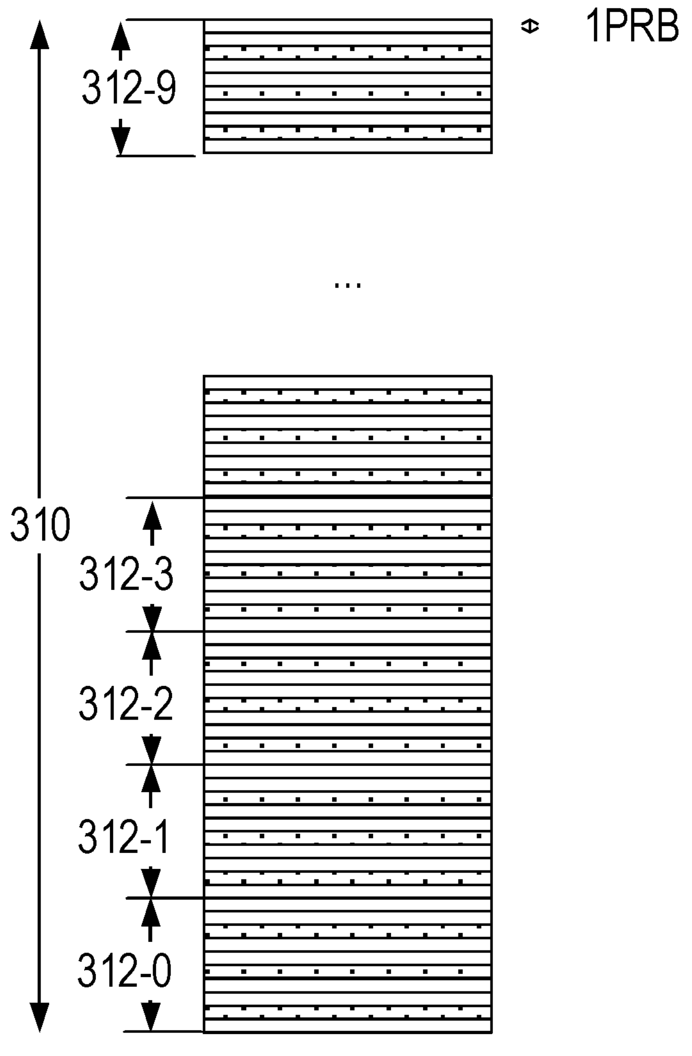

FIG. 3C illustrates an example of a sub-channel in accordance with some other embodiments of the present disclosure. In the example of FIG. 3C, each of the at least one sub-channel may comprise a plurality of non-consecutive interlace.

As shown in FIG. 3C, the RB set 310 may have a bandwidth of about 20 MHz and each subcarrier may span about 15 kHz in frequency. In such an example, a bandwidth of LBT is also 20 MHz. The RB set 310 comprises ten clusters of RBs, i.e., 312-0, 312-1, 312-2, 312-3, . . . , 312-9. Each of the clusters may comprise ten or eleven RBs. Each of interlaces may comprise ten or eleven RBs. Each of sub-channels comprises three non-consecutive interlaces which having indices of 1, 4, 7 (also referred to as interlaces #1, #4, #7). A gap among the three non-consecutive interlaces is three.

In some embodiments, each of the at least one sub-channel may comprise the at least one interlace in an RB set bundle. The RB set bundle comprises a plurality of RB sets. The number of the plurality of RB sets in the RB set bundle may be configured or pre-configured. This will be described with reference to FIGS. 4A, 4B, and 4C.

Figure 4A:
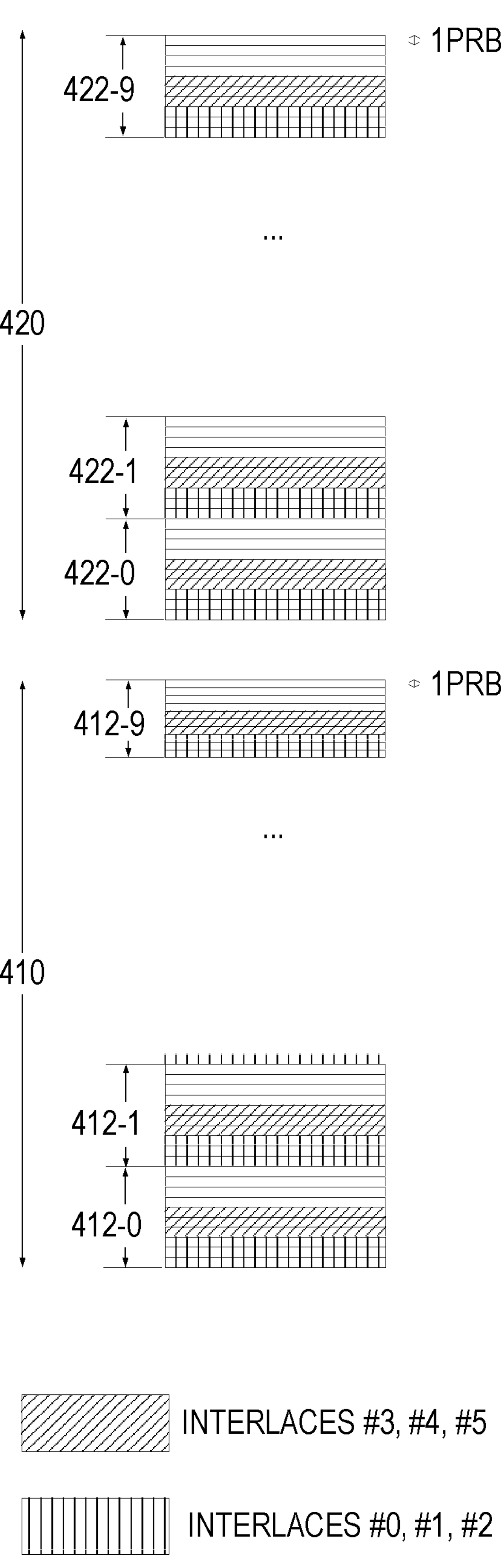
FIGS. 4A, 4B and 4C illustrate an example of sub-channels in accordance with some embodiments of the present disclosure, respectively.
Figure 4B:
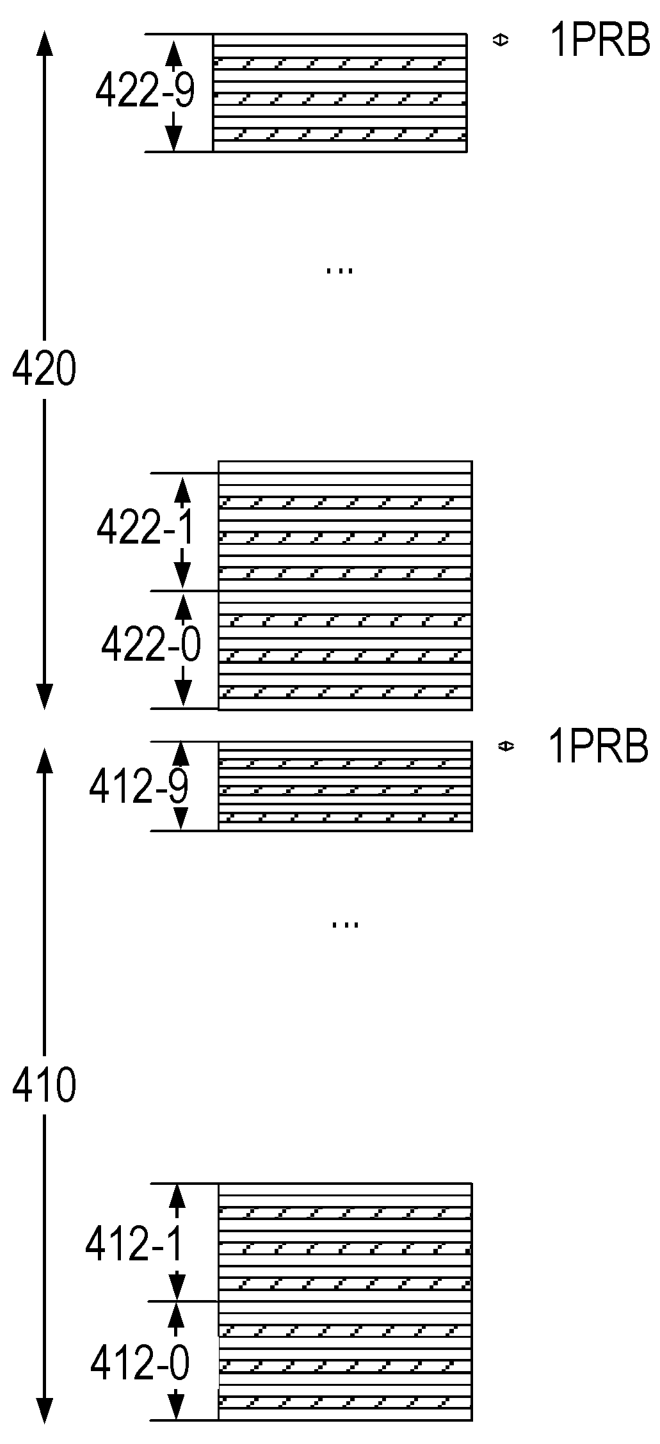
Figure 4C:
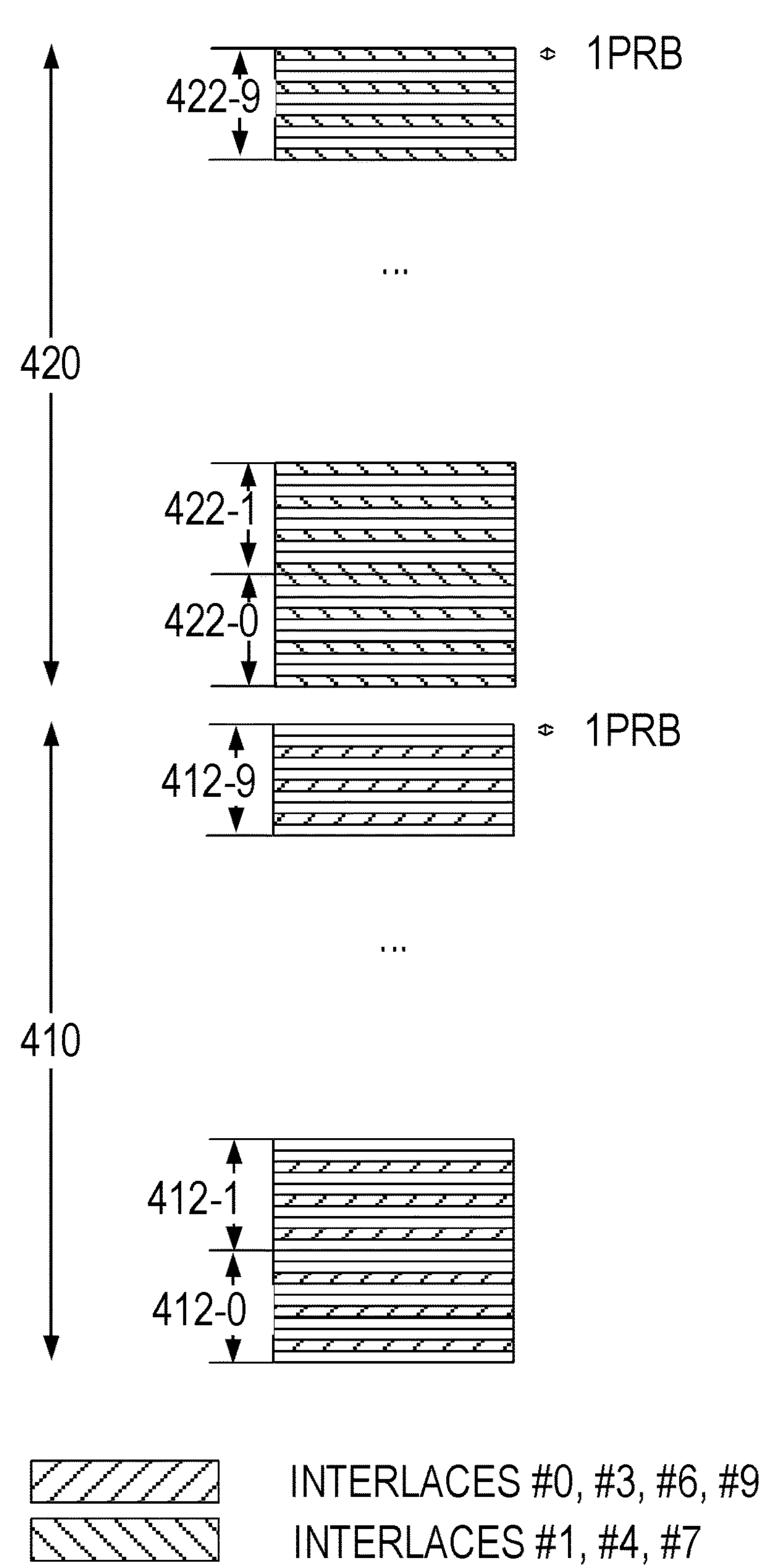

FIGS. 4A, 4B, and 4C illustrate an example of sub-channels in accordance with some embodiments of the present disclosure, respectively. In the examples of FIGS. 4A, 4B, and 4C, an RB set bundle comprises RB sets 410 and 420. Each of the RB sets 410 and 420 may have a bandwidth of about 20 MHz and each subcarrier may span about 15 KHz in frequency. In such examples, a bandwidth of LBT is also 20 MHz. The RB set 410 comprises ten clusters of RBs, i.e., 412-0, 412-1, . . . , 412-9. The RB set 420 comprises ten clusters of RBs, i.e., 422-0, 422-1, . . . , 422-9. Each of the clusters may comprise ten or eleven RBs. Each of interlaces may comprise ten or eleven RBs.

In the example of FIG. 4A, a sub-channel comprises three consecutive interlaces which having indices of 0, 1, 2 (also referred to as interlaces #0, #1, #2). Another sub-channel having an index of 1 comprises three consecutive interlaces which having indices of 3, 4, 5 (also referred to as interlaces #3, #4, #5).

In the example of FIG. 4B, a sub-channel comprises three non-consecutive interlaces which having indices of 1, 4, 7 (also referred to as interlaces #1, #4, #7) in each of the RB sets 410 and 420. A gap among the three non-consecutive interlaces is three.

In the example of FIG. 4B, the first terminal device 110 or the second terminal device 120 may determine a sub-channel comprising a first set of interlaces in the RB set 410 and a second set of interlaces in the RB set 420 bundle duplicating the first set of interlaces in the second RB set.

In the example of FIG. 4C, a sub-channel comprises non-consecutive interlaces which having indices of 1, 4, 7 (also referred to as interlaces #1, #4, #7) in the RB set 410 and non-consecutive interlaces which having indices of 0, 3, 6, 9 (also referred to as interlaces #0, #3, #6, #9) in the RB set 420.

In the example of FIG. 4C, the first terminal device 110 or the second terminal device 120 may determine a sub-channel comprising the interlaces #1, #4, #7, #0, #3, #6, #9 across the RB sets 410 and 420 in a consecutive manner.

In embodiments where each of the at least one sub-channel comprises the at least one frequency interlace in a single RB set, after a success of an LBT process, the first terminal device 110 may determine that one or multiple consecutive or non-consecutive RB sets are available for sidelink transmission. The first terminal device 110 may determine the at least one sub-channel and RB sets for transmitting the data and associated control information as following.

The first terminal device 110 may determine the number of the at least one sub-channel based on the size of the data to be transmitted. The number of the at least one sub-channel may be represented by L. The first terminal device 110 may determine a first number of consecutive RB sets available for transmitting the data and the control information. The first number may be represented by R.

The first terminal device 110 may select L/R sub-channels in each of R consecutive RB set(s) to reduce signaling overhead. The R RB sets may start from the lowest available RB set and indices of the selected sub-channels in each RB set may be same.

The first terminal device 110 may ensure that a ratio (also referred to a second number) of the number (L) of the at least one sub-channel to the first number R is a positive integer. Otherwise, the first terminal device 110 may select L sub-channels in a single RB set. In other words, if L/R is not equal to a positive integer, R=1.

In some embodiments, the first terminal device 110 may indicate to the second terminal device 120 the first number and the second number by the control information.

In some embodiments, the first terminal device 110 may transmit the control information in at least one RB in a starting sub-channel in a starting RB set among the first number of consecutive RB sets, the at least one RB at least comprising a starting RB in the starting sub-channel. In other words, the first terminal device 110 may transmit the control information in the lowest M PRBs of the lowest sub-channel in the lowest RB set of the associated data and C symbols from the SL-U slot beginning, where M and C are positive integers. In some embodiments, M should be less than a size of one sub-channel.

For the reception of the control information, the second terminal device 120 may blindly decode the control information in the lowest M RBs in each of the sub-channels of each RB set.

For the reception of the data on L sub-channels, the second terminal device 120 may determine the R RB sets and L/R sub-channels in each RB set from the decoded control information.

FIGS. 5A, 5B, 5C, 5D, 5E, 5F and 5G illustrate an example of sub-channels in accordance with some embodiments of the present disclosure, respectively.

Figure 5A:
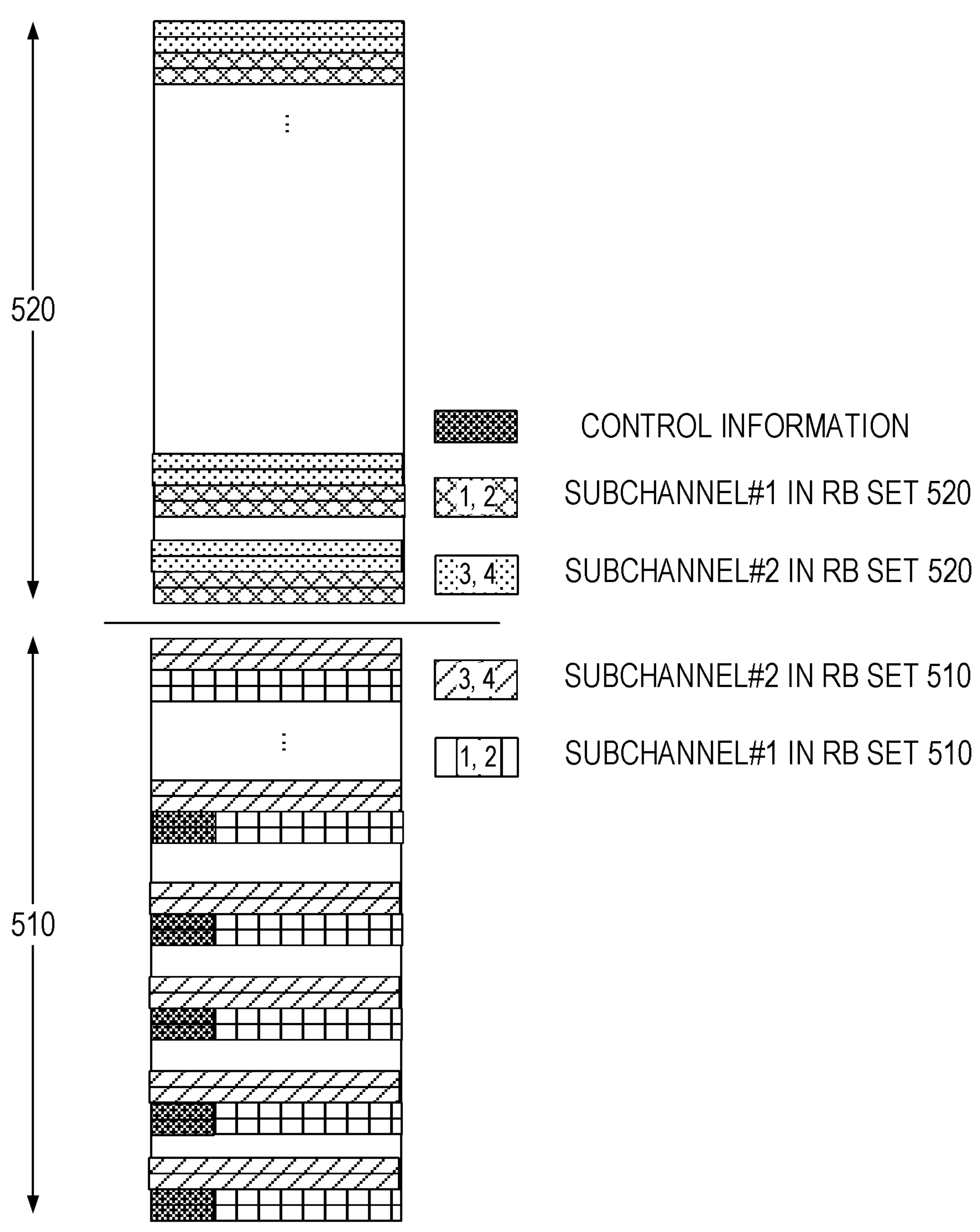
FIGS. 5A, 5B, 5C, 5D, 5E, 5F and 5G illustrate an example of sub-channels in accordance with some embodiments of the present disclosure, respectively.

In the example of FIG. 5A, based on the size of the data to be transmitted, the first terminal device 110 determines that the number (L) of the at least one sub-channel is equal to four. The first terminal device 110 may determine two consecutive RB sets 510 and 520 available for transmitting the data and the control information. Each of the RB sets 510 and 520 may have a bandwidth of about 20 MHz.

The first terminal device 110 may select two sub-channels in each of the two consecutive RB sets 510 and 520. As shown in FIG. 5A, the first terminal device 110 may select a sub-channel #1 in each of the RB sets 510 and 520 and a sub-channel #2 in each of the RB sets 510 and 520. The sub-channel #1 comprises interlaces #1 and #2 in each of the RB sets 510 and 520. The sub-channel #2 comprises interlaces #3 and #4 in each of the RB sets 510 and 520. The first terminal device 110 transmits the control information in ten RBs in the sub-channel #1 in the RB set 510.

Figure 5B:
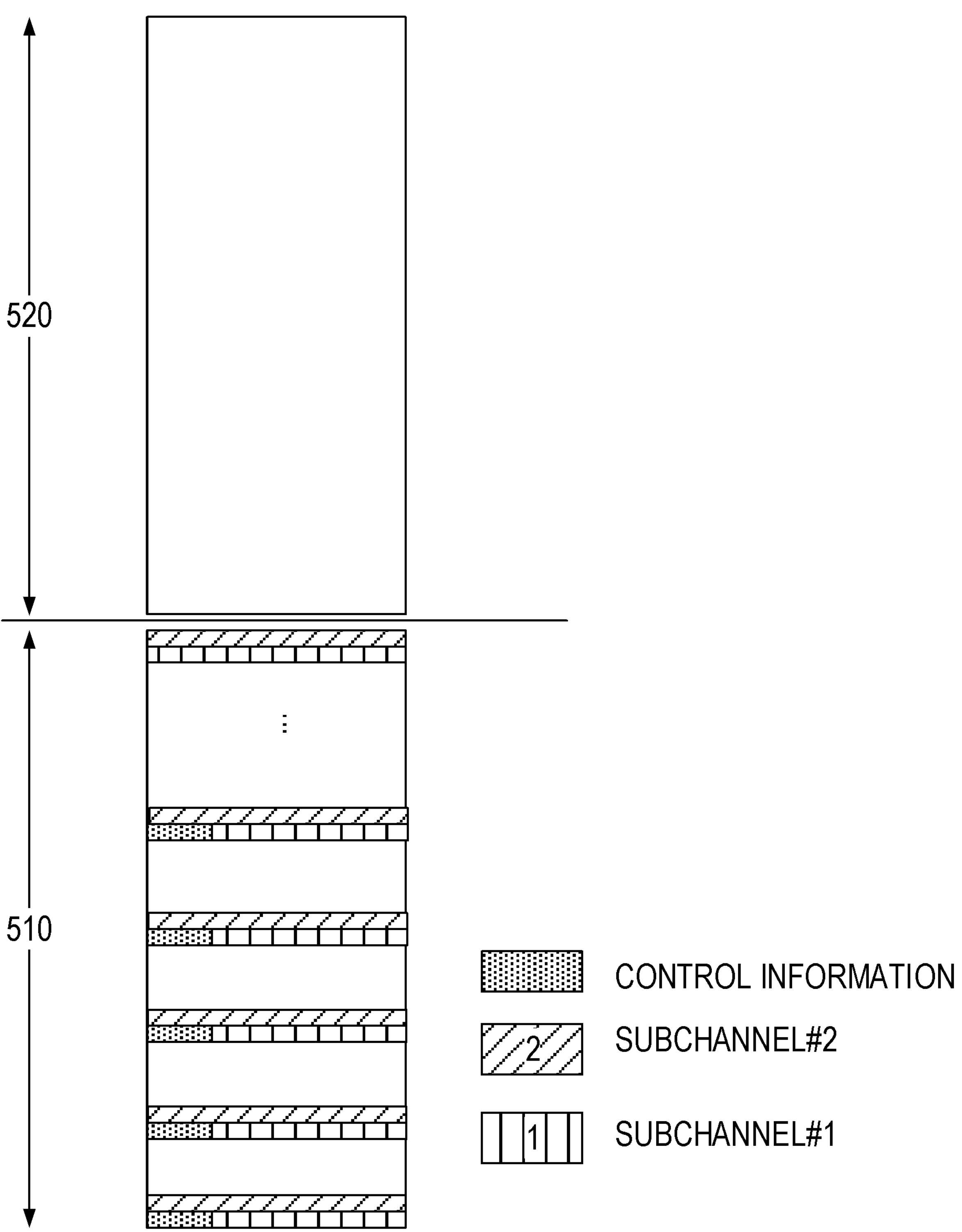

In the example of FIG. 5B, based on the size of the data to be transmitted, the first terminal device 110 determines that the number (L) of the at least one sub-channel is equal to two. The first terminal device 110 may determine the RB set 510 available for transmitting the data and the control information.

The first terminal device 110 may select two sub-channels in the RB set 510. As shown in FIG. 5B, the first terminal device 110 may select sub-channels #1 and #2 in the RB set 510. The sub-channel #1 comprises interlace #1 in the RB set 510. The sub-channel #2 comprises interlace #2 in the RB set 510. The first terminal device 110 transmits the control information in five RBs in the sub-channel #1 in the RB set 510.

Figure 5C:
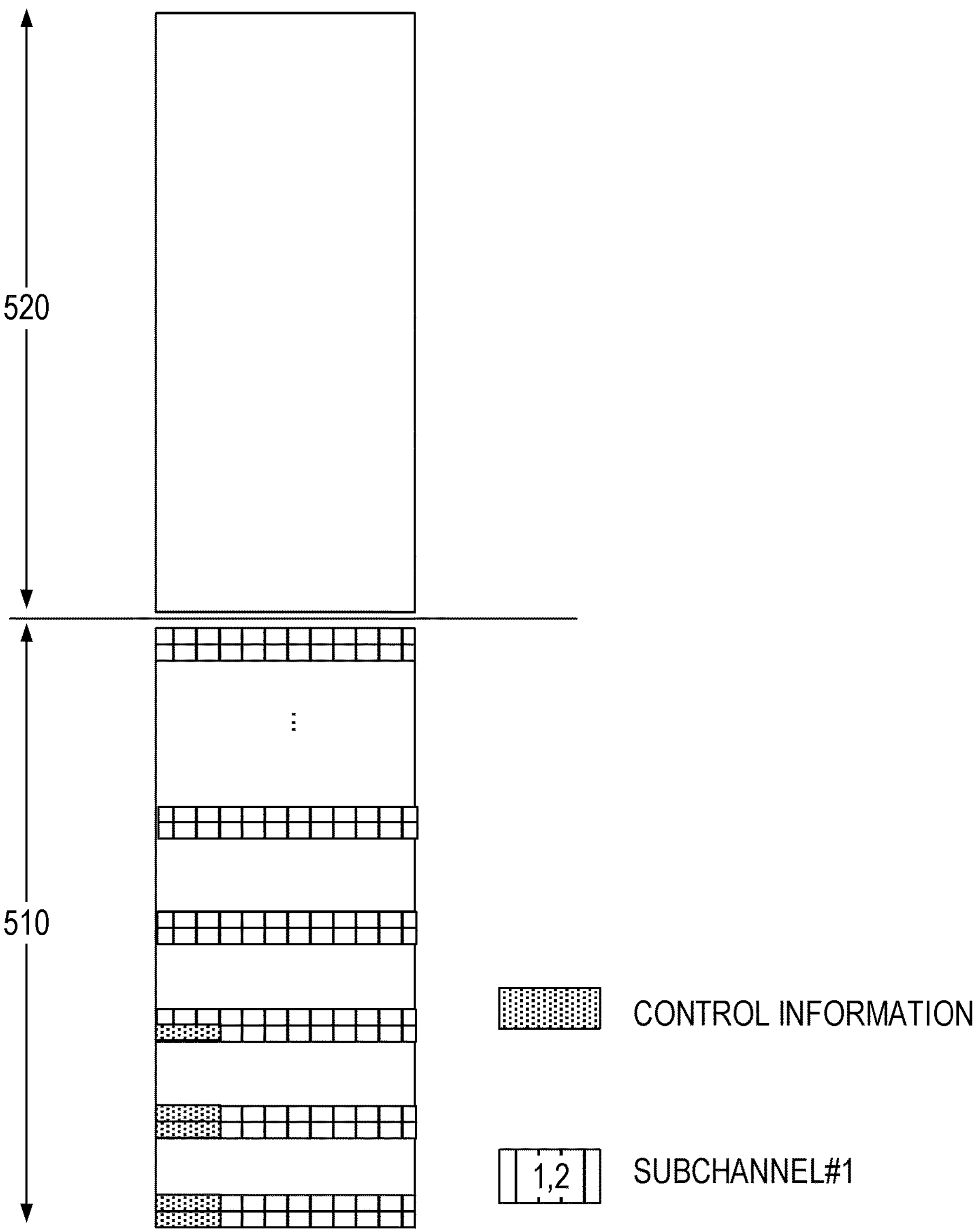

In the example of FIG. 5C, based on the size of the data to be transmitted, the first terminal device 110 determines that the number (L) of the at least one sub-channel is equal to one. The first terminal device 110 may determine the RB set 510 available for transmitting the data and the control information.

The first terminal device 110 may select one sub-channel in the RB set 510. As shown in FIG. 5C, the first terminal device 110 may select sub-channel #1 in the RB set 510. The sub-channel #1 comprises interlaces #1 and #2 in the RB set 510. The first terminal device 110 transmits the control information in five RBs in the sub-channel #1 in the RB set 510.

Figure 5D:
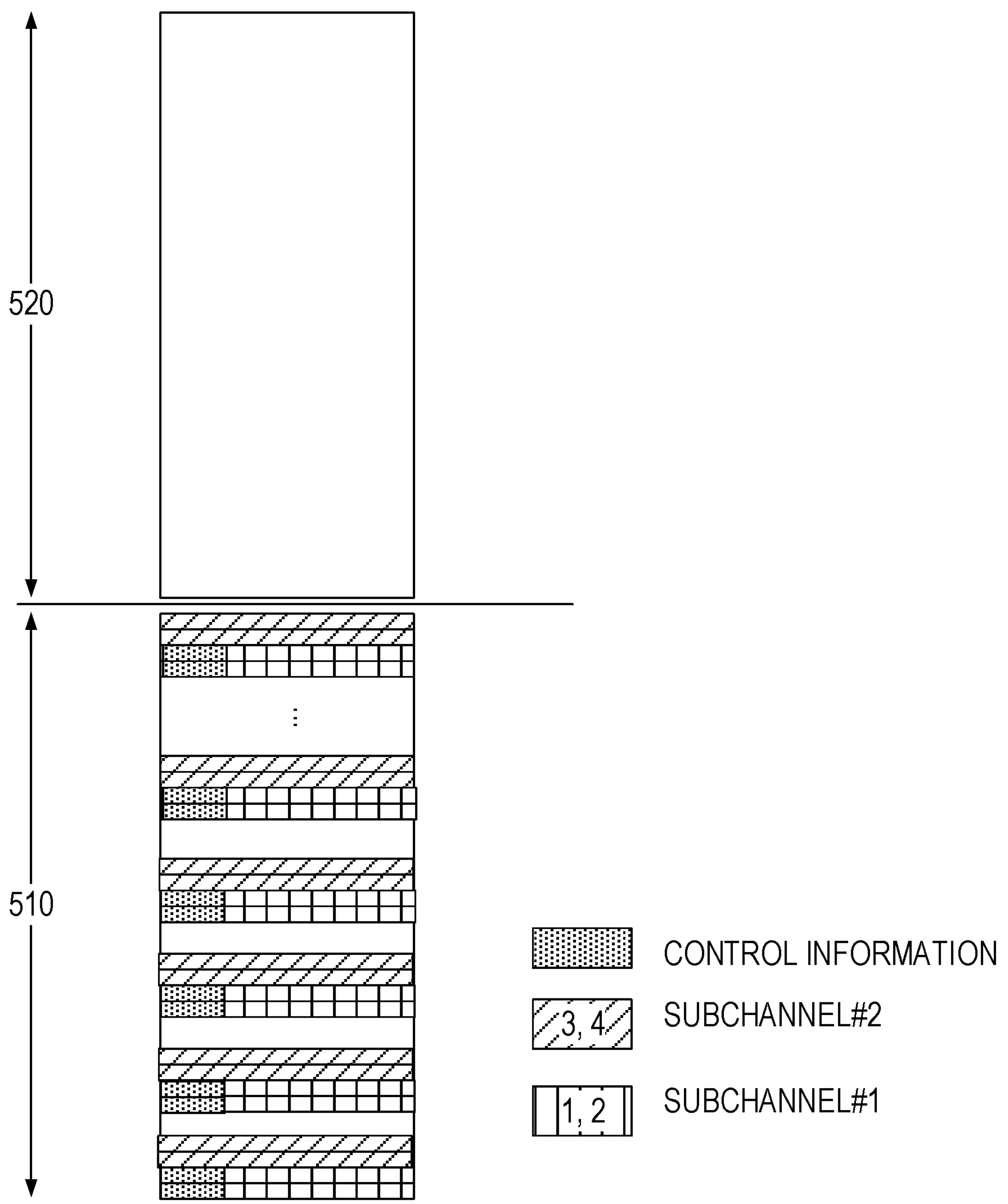

In the example of FIG. 5D, based on the size of the data to be transmitted, the first terminal device 110 determines that the number (L) of the at least one sub-channel is equal to two. The first terminal device 110 may determine the RB set 510 available for transmitting the data and the control information.

The first terminal device 110 may select two sub-channels in the RB set 510. As shown in FIG. 5D, the first terminal device 110 may select sub-channels #1 and #2 in the RB set 510. The sub-channel #1 comprises interlaces #1 and #2 in the RB set 510. The sub-channel #2 comprises interlaces #3 and #4 in the RB set 510. The first terminal device 110 transmits the control information in twenty RBs in the sub-channel #1 in the RB set 510.

Figure 5E:
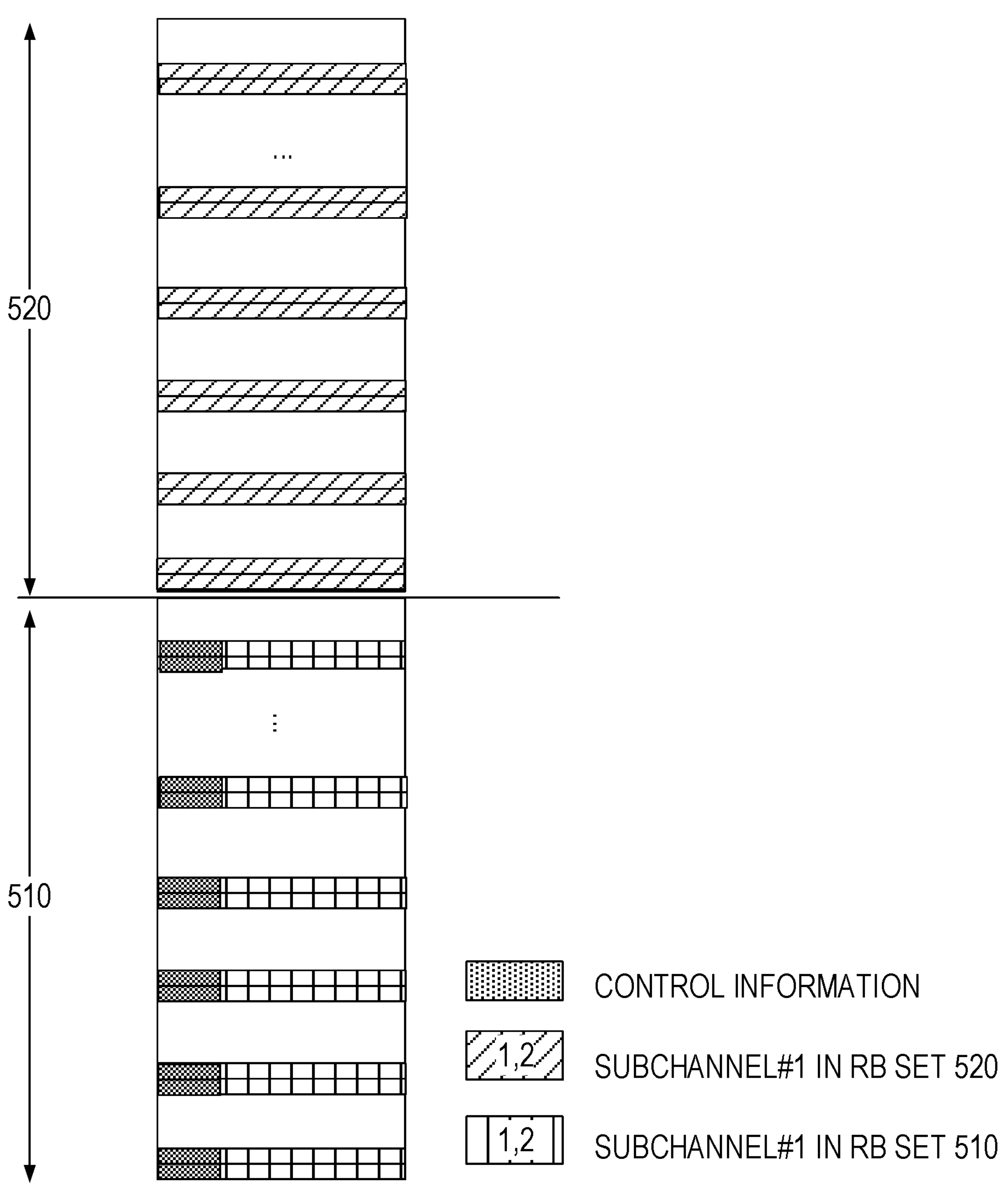

In the example of FIG. 5E, based on the size of the data to be transmitted, the first terminal device 110 determines that the number (L) of the at least one sub-channel is equal to two. The first terminal device 110 may determine two consecutive RB sets 510 and 520 available for transmitting the data and the control information.

The first terminal device 110 may select one sub-channel in each of the two consecutive RB sets 510 and 520. As shown in FIG. 5E, the first terminal device 110 may select a sub-channel #1 in each of the RB sets 510 and 520. The sub-channel #1 in the RB set 510 comprises interlaces #1 and #2 in the RB set 510. The sub-channel #1 in the RB set 520 comprises interlaces #1 and #2 in the RB set 520. The first terminal device 110 transmits the control information in twenty RBs in the sub-channel #1 in the RB set 510.

Figure 5F:
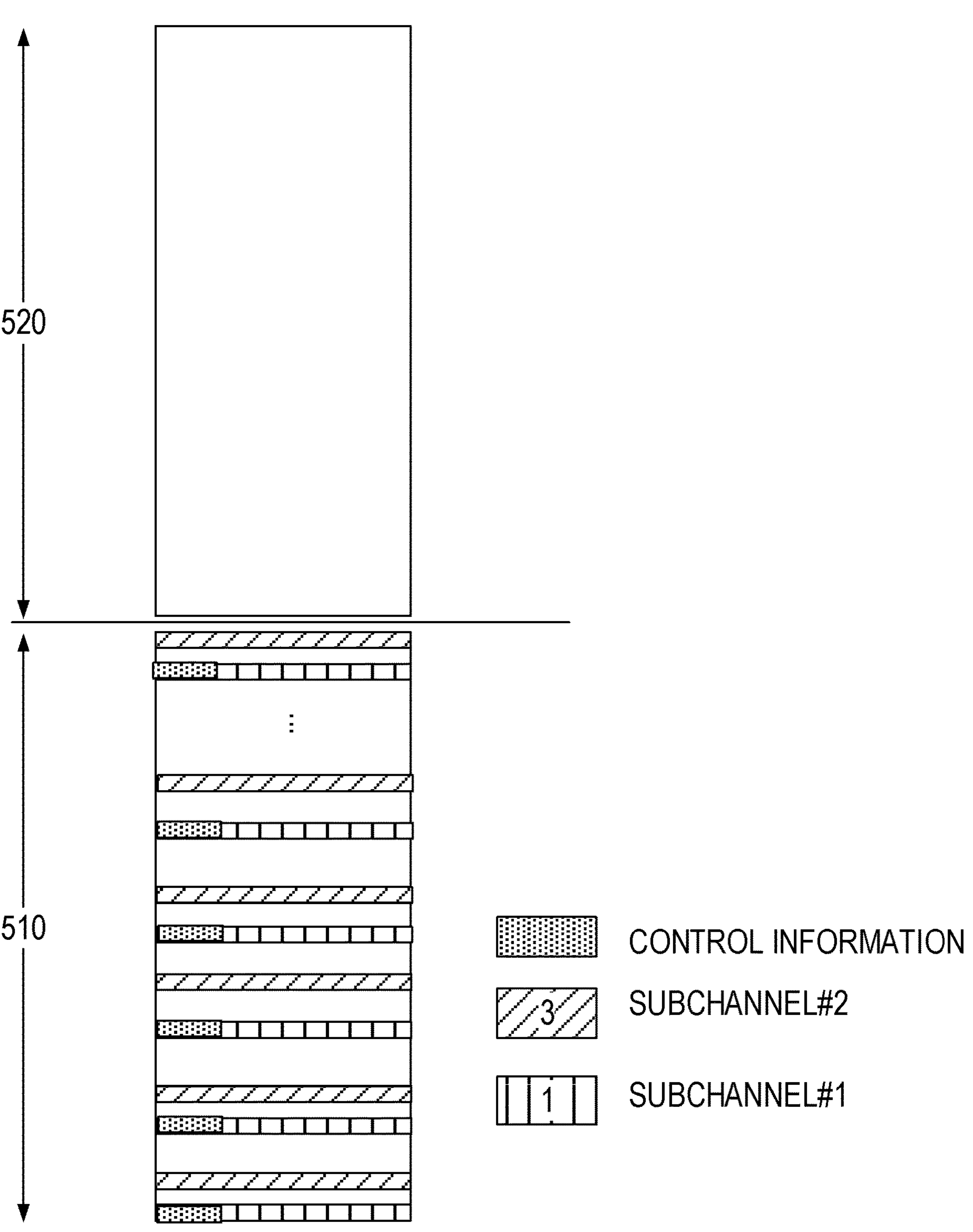

In the example of FIG. 5F, based on the size of the data to be transmitted, the first terminal device 110 determines that the number (L) of the at least one sub-channel is equal to two. The first terminal device 110 may determine the RB set 510 available for transmitting the data and the control information.

The first terminal device 110 may select two non-consecutive sub-channels in the RB set 510. As shown in FIG. 5F, the first terminal device 110 may select sub-channels #1 and #2 in the RB set 510. The sub-channel #1 comprises an interlace #1 in the RB set 510. The sub-channel #2 comprises an interlace #3 in the RB set 510. The first terminal device 110 transmits the control information in ten RBs in the sub-channel #1 in the RB set 510.

Figure 5G:
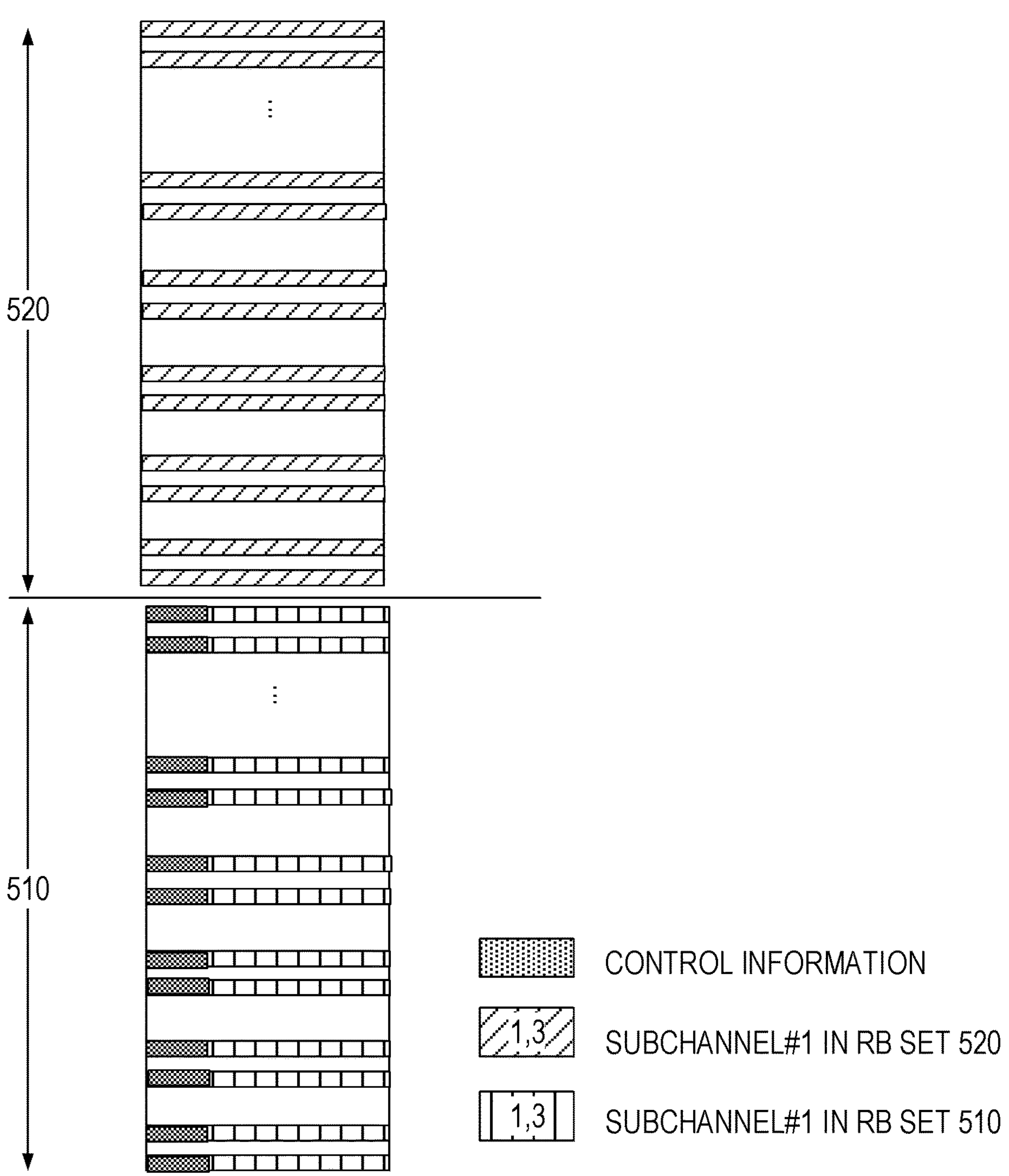

In the example of FIG. 5G, based on the size of the data to be transmitted, the first terminal device 110 determines that the number (L) of the at least one sub-channel is equal to two. The first terminal device 110 may determine two consecutive RB sets 510 and 520 available for transmitting the data and the control information.

The first terminal device 110 may select one sub-channel in each of the two consecutive RB sets 510 and 520. As shown in FIG. 5G, the first terminal device 110 may select a sub-channel #1 in each of the RB sets 510 and 520. The sub-channel #1 in the RB set 510 comprises interlaces #1 and #3 in the RB set 510. The sub-channel #1 in the RB set 520 comprises interlaces #1 and #3 in the RB set 520. The first terminal device 110 transmits the control information in twenty RBs in the sub-channel #1 in the RB set 510.

In embodiments where each of the at least one sub-channel comprises the at least one frequency interlace in an RB set bundle, after a success of an LBT process, the first terminal device 110 may determine that one or multiple consecutive or non-consecutive RB set bundles are available for sidelink transmission. The first terminal device 110 may determine the at least one sub-channel and RB sets for transmitting the data and associated control information as following.

The first terminal device 110 may determine the number of the at least one sub-channel based on the size of the data to be transmitted. The number of the at least one sub-channel may be represented by L. The first terminal device 110 may determine a third number of consecutive RB sets available for transmitting the data and the control information. The third number may be represented by R.

The first terminal device 110 may select L/R sub-channels in each of R consecutive RB set bundle(s) to reduce signaling overhead. The R RB set bundles may start from the lowest available RB set bundle and indices of the selected sub-channels in each RB set bundle may be same.

The first terminal device 110 may ensure that a ratio (also referred to a fourth number) of the number (L) of the at least one sub-channel to the third number R is a positive integer. Otherwise, the first terminal device 110 may select L sub-channels in a single RB set bundle. In other words, if L/R is not equal to a positive integer, R=1.

In some embodiments, the first terminal device 110 may indicate to the second terminal device 120 the third number and the fourth number by the control information.

In some embodiments, the first terminal device 110 may transmit the control information in at least one RB in a starting sub-channel in a starting RB set bundle among the third number of consecutive RB set bundles, the at least one RB at least comprising a starting RB in the starting sub-channel. In other words, the first terminal device 110 may transmit the control information in the lowest M RBs of the lowest sub-channel in the lowest RB set bundle of the associated data and C symbols from the SL-U slot beginning, where M and C are positive integers. In some embodiments, M may be less than a size of one sub-channel.

For the reception of the control information, the second terminal device 120 may blindly decode the control information in the lowest M RBs in each of the sub-channels of each RB set bundle.

For the reception of the data on L sub-channels, the second terminal device 120 may determine the R RB set bundles and L/R sub-channels in each RB set bundle from the decoded control information.

FIGS. 6A, 6B, 6C, 6D, 6E, 6F and 6G illustrate an example of sub-channels in accordance with some embodiments of the present disclosure, respectively.

Figure 6A:
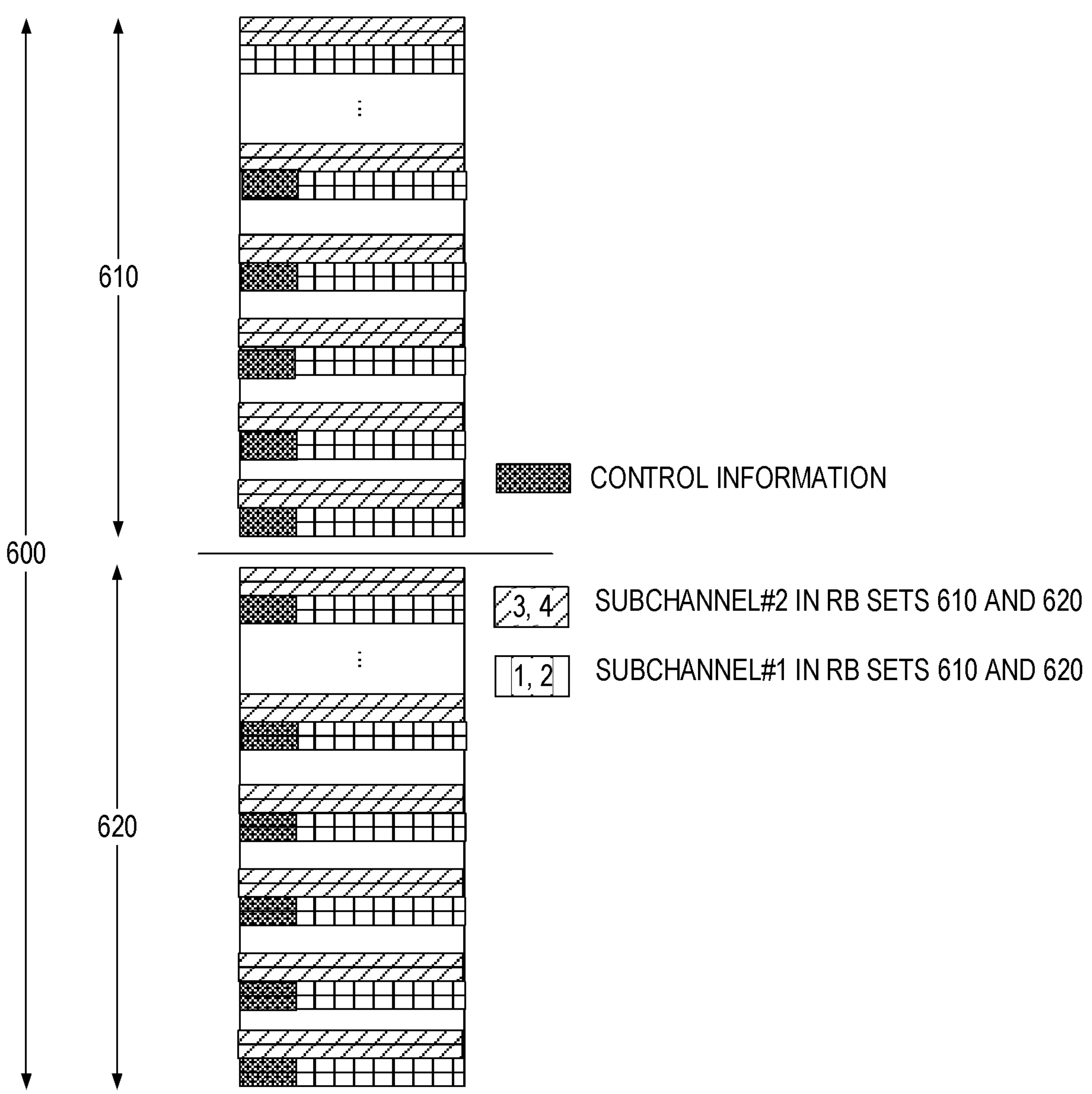
FIGS. 6A, 6B, 6C, 6D, 6E, 6F and 6G illustrate an example of sub-channels in accordance with some embodiments of the present disclosure, respectively.

In the example of FIG. 6A, based on the size of the data to be transmitted, the first terminal device 110 determines that the number (L) of the at least one sub-channel is equal to two. The first terminal device 110 may determine one RB set bundle 600 available for transmitting the data and the control information. The RB set bundle 600 comprises consecutive RB sets 610 and 620. Each of the RB sets 610 and 620 may have a bandwidth of about 20 MHz.

The first terminal device 110 may select two sub-channels in each of the two consecutive RB sets 610 and 620. As shown in FIG. 6A, the first terminal device 110 may select a sub-channel #1 in each of the RB sets 610 and 620 and a sub-channel #2 in each of the RB sets 610 and 620. The sub-channel #1 comprises interlaces #1 and #2 in each of the RB sets 610 and 620. The sub-channel #2 comprises interlaces #3 and #4 in each of the RB sets 610 and 620. The first terminal device 110 transmits the control information in 30 RBs in the sub-channel #1.

Figure 6B:
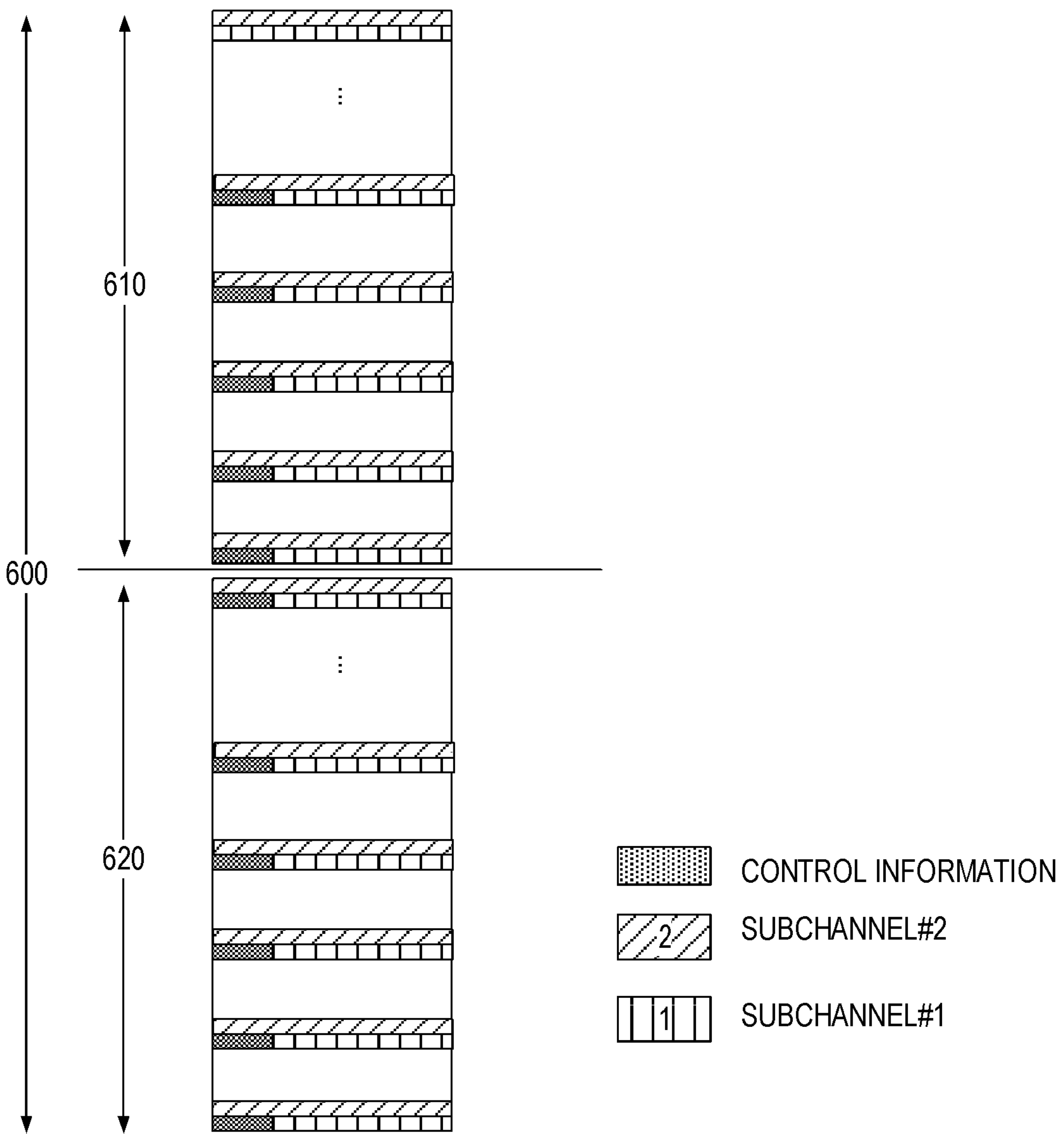

In the example of FIG. 6B, based on the size of the data to be transmitted, the first terminal device 110 determines that the number (L) of the at least one sub-channel is equal to two. The first terminal device 110 may determine one RB set bundle 600 available for transmitting the data and the control information. The RB set bundle 600 comprises consecutive RB sets 610 and 620. Each of the RB sets 610 and 620 may have a bandwidth of about 20 MHZ.

The first terminal device 110 may select two sub-channels in each of the two consecutive RB sets 610 and 620. As shown in FIG. 6B, the first terminal device 110 may select a sub-channel #1 in each of the RB sets 610 and 620 and a sub-channel #2 in each of the RB sets 610 and 620. The sub-channel #1 comprises an interlace #1 in each of the RB sets 610 and 620. The sub-channel #2 comprises an interlace #2 in each of the RB sets 610 and 620. The first terminal device 110 transmits the control information in 15 RBs in the sub-channel #1.

Figure 6C:
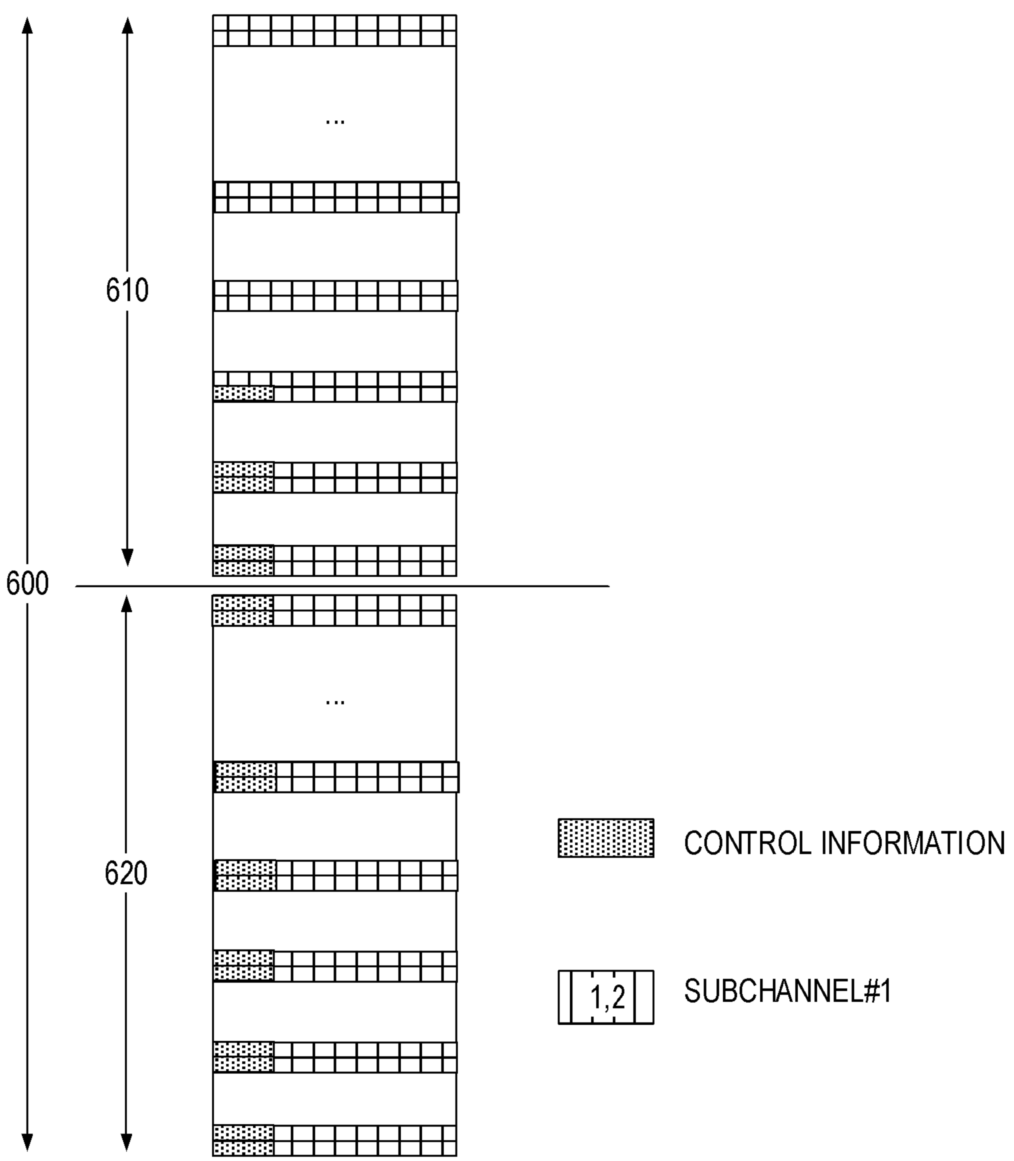

In the example of FIG. 6C, based on the size of the data to be transmitted, the first terminal device 110 determines that the number (L) of the at least one sub-channel is equal to one. The first terminal device 110 may determine one RB set bundle 600 available for transmitting the data and the control information. The RB set bundle 600 comprises consecutive RB sets 610 and 620. Each of the RB sets 610 and 620 may have a bandwidth of about 20 MHz.

The first terminal device 110 may select one sub-channel in each of the two consecutive RB sets 610 and 620. As shown in FIG. 6C, the first terminal device 110 may select a sub-channel #1 in each of the RB sets 610 and 620. The sub-channel #1 comprises interlaces #1 and #2 in each of the RB sets 610 and 620. The first terminal device 110 transmits the control information in 15 RBs in the sub-channel #1.

Figure 6D:
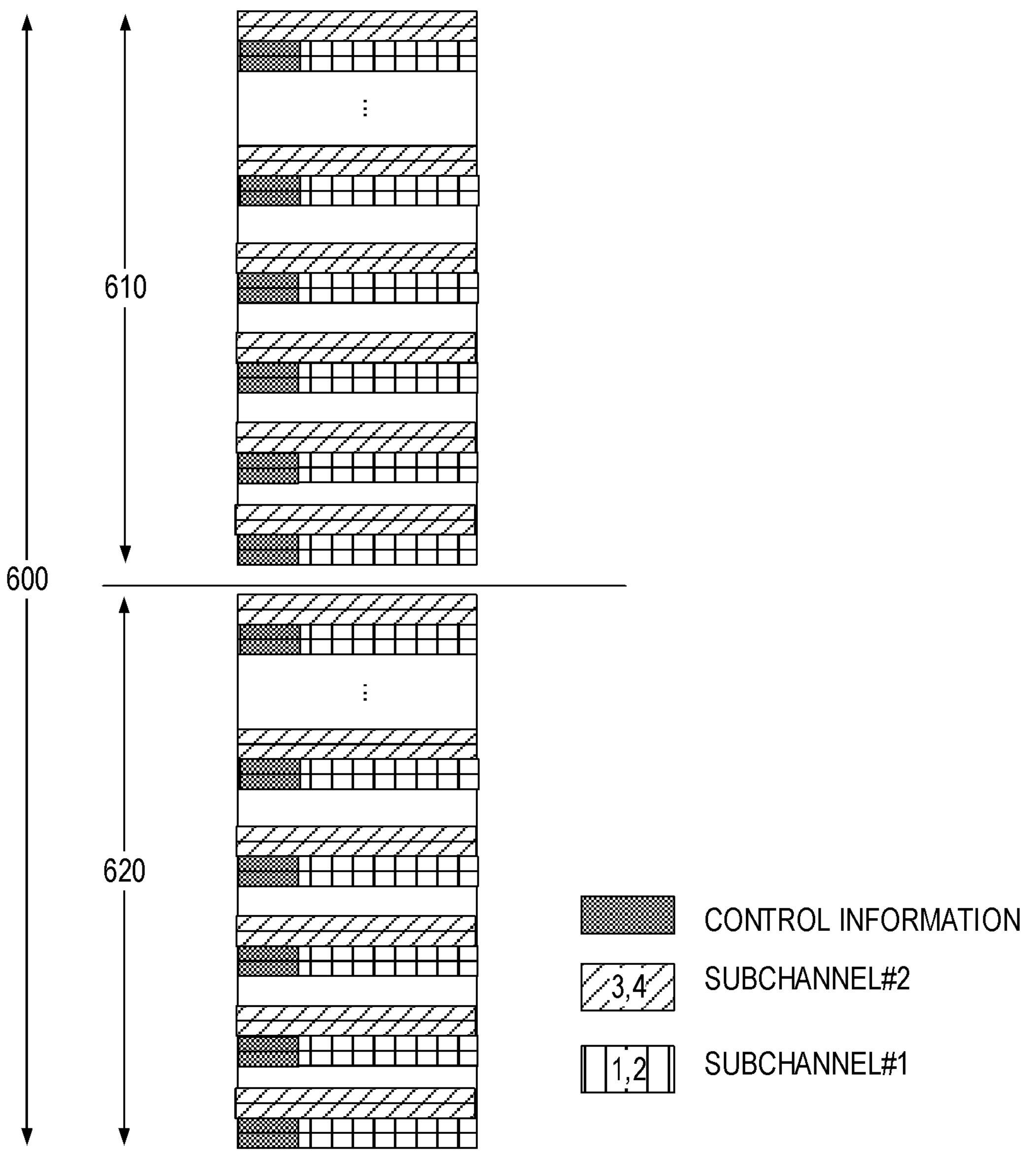

The example of FIG. 6D is similar to the example of FIG. 6A. However, the example of FIG. 6D is different from the example of FIG. 6A in that the first terminal device 110 transmits the control information in 40 RBs in the sub-channel #1.

Figure 6E:
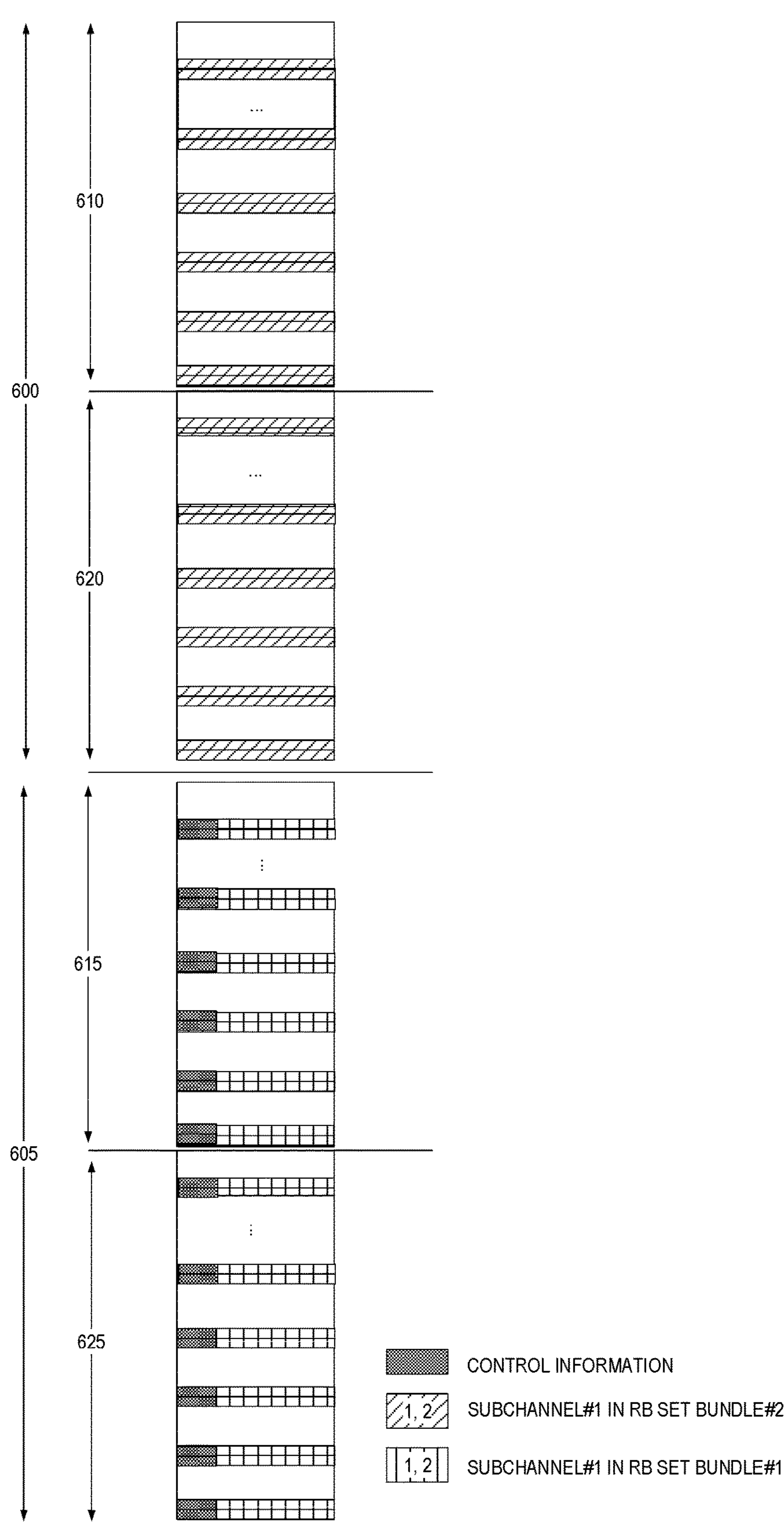

In the example of FIG. 6E, based on the size of the data to be transmitted, the first terminal device 110 determines that the number (L) of the at least one sub-channel is equal to two. The first terminal device 110 may determine two consecutive RB set bundles 600 and 605 available for transmitting the data and the control information. The RB set bundle 600 comprises consecutive RB sets 610 and 620. The RB set bundle 605 comprises consecutive RB sets 615 and 625. Each of the RB sets 610, 620, 615 and 625 may have a bandwidth of about 20 MHZ.

The first terminal device 110 may select two sub-channels in each of the two consecutive RB set bundles 600 and 605. As shown in FIG. 6E, the first terminal device 110 may select a sub-channel #1 in the RB set bundles 600 and 605. The sub-channel #1 comprises interlaces #1 and #2 in the RB set bundle 600 as well as interlaces #1 and #2 in the RB set bundle 605. The first terminal device 110 transmits the control information in 40 RBs in the sub-channel #1 in the RB set bundle 600.

Figure 6F:
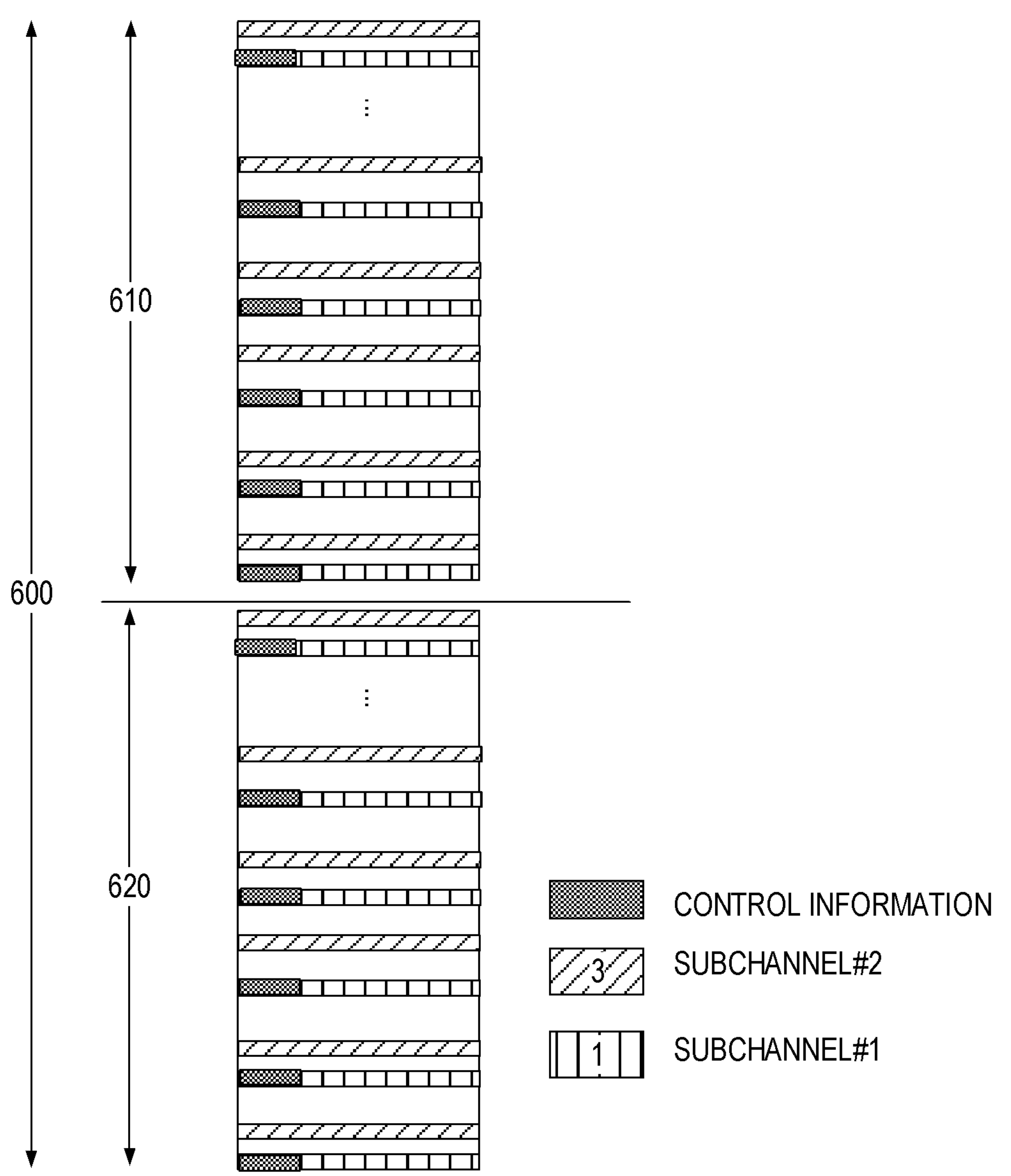

In the example of FIG. 6F, based on the size of the data to be transmitted, the first terminal device 110 determines that the number (L) of the at least one sub-channel is equal to two. The first terminal device 110 may determine one RB set bundle 600 available for transmitting the data and the control information. The RB set bundle 600 comprises consecutive RB sets 610 and 620. Each of the RB sets 610 and 620 may have a bandwidth of about 20 MHz.

The first terminal device 110 may select two sub-channels in each of the two consecutive RB sets 610 and 620. As shown in FIG. 6F, the first terminal device 110 may select a sub-channel #1 in each of the RB sets 610 and 620 and a sub-channel #2 in each of the RB sets 610 and 620. The sub-channel #1 comprises an interlace #1 in each of the RB sets 610 and 620. The sub-channel #2 comprises an interlace #3 in each of the RB sets 610 and 620. The first terminal device 110 transmits the control information in 20 RBs in the sub-channel #1.

Figure 6G:
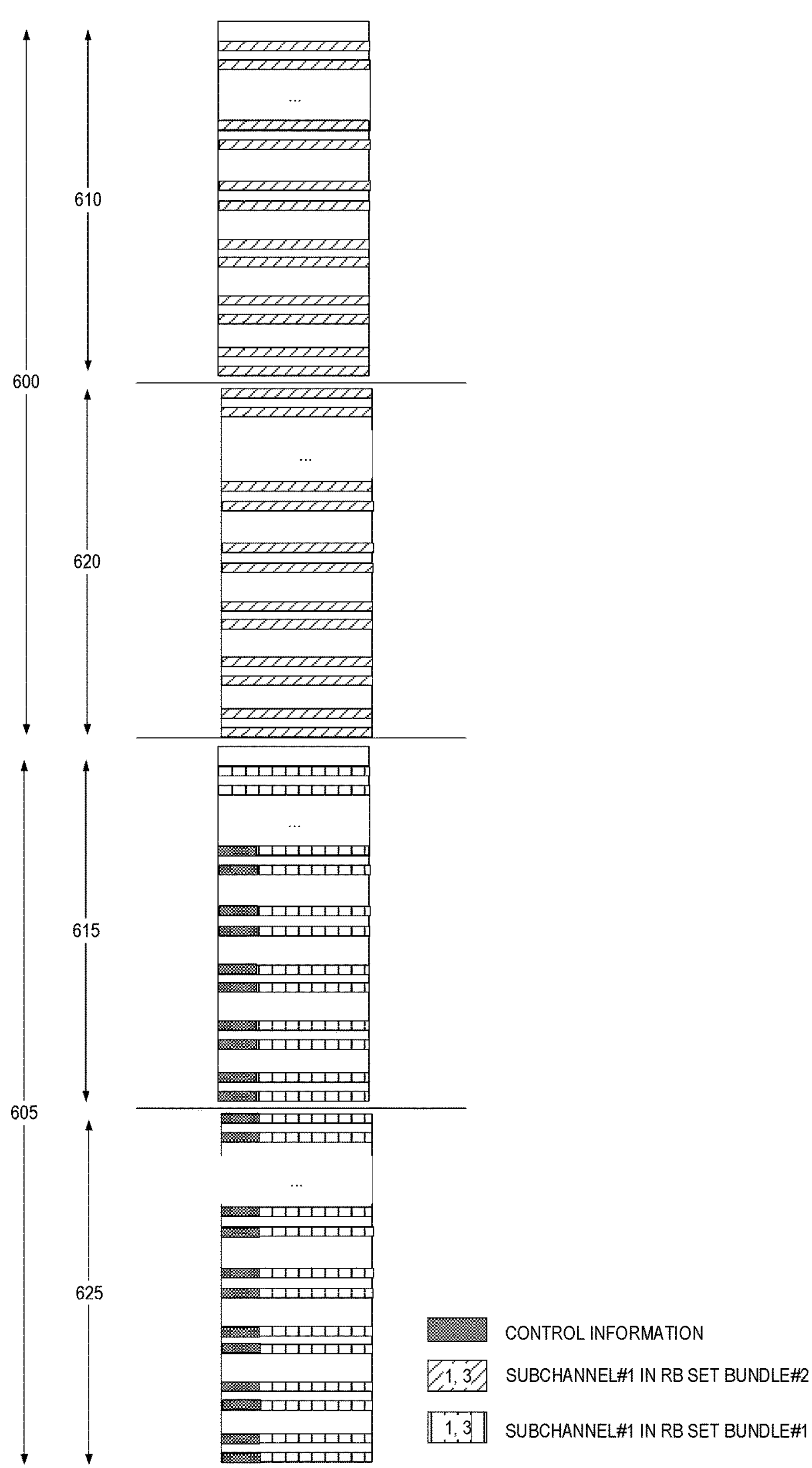

In the example of FIG. 6G, based on the size of the data to be transmitted, the first terminal device 110 determines that the number (L) of the at least one sub-channel is equal to two. The first terminal device 110 may determine two consecutive RB set bundles 600 and 605 available for transmitting the data and the control information. The RB set bundle 600 comprises consecutive RB sets 610 and 620. The RB set bundle 605 comprises consecutive RB sets 615 and 625. Each of the RB sets 610, 620, 615 and 625 may have a bandwidth of about 20 MHz.

The first terminal device 110 may select two sub-channels in each of the two consecutive RB set bundles 600 and 605. As shown in FIG. 6G, the first terminal device 110 may select a sub-channel #1 in the RB set bundles 600 and 605. The sub-channel #1 comprises interlaces #1 and #3 in the RB set bundle 600 as well as interlaces #1 and #3 in the RB set bundle 605. The first terminal device 110 transmits the control information in 30 RBs in the sub-channel #1 in the RB set bundle 600.

In some embodiments, the first terminal device 110 may receive configuration information about the at least one sub-channel from a network device or a higher layer of the first terminal device 110. In turn, the first terminal device 110 may determine the at least one frequency interlace in the single RB set or in an RB set bundle based on the configuration information. For example, the first terminal device 110 may receive the configuration information via RRC parameter sl-u-subchannel.

In some embodiments, the first terminal device 110 may determine the at least one frequency interlace in the single RB set or in an RB set bundle based on pre-configuration information.

In some embodiments, additionally, the first terminal device 110 may determine the at least one frequency interlace in the single RB set by default.

Alternatively, the first terminal device 110 may receive an indication of channel occupation time (COT) from a fourth terminal device. In turn, the first terminal device 110 may determine the at least one frequency interlace in the RB set bundle based on the indication.

In some embodiments, if a first type of an LBT process (i.e., type 1 LBT) succeeds, the first terminal device 110 may determine the at least one frequency interlace in the single RB set. If a second type of an LBT process (i.e., type 2-a LBT, type 2-b LBT, or type 2-c LBT) succeeds, the first terminal device 110 may determine the at least one frequency interlace in an RB set bundle.

In some embodiments, a resource pool for sidelink transmission may contain only one RB set, and the first terminal device 110 or the second terminal device 120 may select resources across multiple resource pools.

Alternatively, a resource pool for sidelink transmission may contain multiple RB sets, and the first terminal device 110 or the second terminal device 120 may select resource across multiple RB sets within only one resource pool.

FIG. 7 illustrates a flowchart of an example method 700 in accordance with some embodiments of the present disclosure. In some embodiments, the method 700 can be implemented at a terminal device, such as the first terminal device 110 as shown in FIG. 1. For the purpose of discussion, the method 700 will be described with reference to FIG. 1 as performed by the first terminal device 110 without loss of generality.

At block 710, the first terminal device 110 determines at least one sub-channel based on a size of data to be transmitted. Each of the at least one sub-channel comprises at least one frequency interlace.

At block 720, the first terminal device 110 transmits, to a second terminal device, the data and control information associated with the data on the at least one sub-channel via a sidelink between the first terminal device and the second terminal device.

In some embodiments, the number of the at least one frequency interlace is configured or pre-configured.

In some embodiments, additionally, the first terminal device 110 may determine the number of the at least one frequency interlace based on a size of resources in frequency domain for transmit the control information.

In some embodiments, each of the at least one sub-channel may comprise a plurality of consecutive frequency interlace.

In some embodiments, each of the at least one sub-channel may comprise a plurality of non-consecutive frequency interlace, and a gap among the at least one frequency interlace is configured or pre-configured.

In some embodiments, each of the at least one sub-channel may comprise the at least one frequency interlace in a single RB set.

In some embodiments, the first terminal device 110 may determine a first number of consecutive RB sets available for transmit the data and the control information. If a second number is a positive integer, the first terminal device 110 may select the second number of sub-channels in each of the first number of RB sets. The second number is equal to a ratio of the number of the at least one sub-channel to the first number.

In some embodiments, the control information indicates the first number and the second number.

In some embodiments, the first terminal device 110 may transmit the control information in at least one RB in a starting sub-channel in a starting RB set among the first number of consecutive RB sets, the at least one RB at least comprising a starting RB in the starting sub-channel.

In some embodiments, additionally, the first terminal device 110 may receive configuration information about the at least one sub-channel from a network device or a higher layer of the first terminal device 110. The first terminal device 110 may determine the at least one frequency interlace in the single RB set based on the configuration information.

In some embodiments, additionally, the first terminal device 110 may determine the at least one frequency interlace in the single RB set based on pre-configuration information.

In some embodiments, additionally, the first terminal device 110 may determine the at least one frequency interlace in the single RB set by default.

In some embodiments, additionally, in response to a success of a first type of a listen before talk process, the first terminal device 110 may determine the at least one frequency interlace in the single RB set.

In some embodiments, each of the at least one sub-channel comprises the at least one frequency interlace in a Resource Block, RB, set bundle, the RB set bundle comprising a plurality of RB sets.

In some embodiments, the number of the plurality of RB sets in the RB set bundle is configured or pre-configured.

In some embodiments, additionally, the first terminal device 110 may determine a first set of frequency interlaces in a first RB set in the RB set bundle and determine a second set of frequency interlaces in a second RB set in the RB set bundle duplicating the first set of frequency interlaces in the second RB set.

In some embodiments, additionally, the first terminal device 110 may determine the at least one frequency interlace across the plurality of RB sets in the RB set bundle in a consecutive manner.

In some embodiments, the first terminal device 110 may determine a third number of consecutive RB set bundles available for transmit the data and the control information. If a fourth number is a positive integer, the first terminal device 110 may select the fourth number of sub-channels in each of the third number of RB set bundles, the fourth number being equal to a ratio of the number of the at least one sub-channel to the third number.

In some embodiments, the control information indicates the third number and the fourth number.

In some embodiments, the first terminal device 110 may transmit the control information in at least one RB in a starting sub-channel in a starting RB set bundle among the third number of consecutive RB set bundles, the at least one RB at least comprising a starting RB in the starting sub-channel.

In some embodiments, additionally, the first terminal device 110 may receive configuration information about the at least one sub-channel from a network device or a higher layer of the first terminal device 110 and determine the at least one frequency interlace in the RB set bundle based on the configuration information.

In some embodiments, additionally, the first terminal device 110 may determine the at least one frequency interlace in the RB set bundle based on pre-configuration information.

In some embodiments, additionally, the first terminal device 110 may receive an indication of channel occupation time from a fourth device and determine the at least one frequency interlace in the RB set bundle based on the indication.

In some embodiments, additionally, in response to a success of a second type of a listen before talk process, the first terminal device 110 may determine the at least one frequency interlace in the RB set bundle.

FIG. 8 illustrates a flowchart of an example method 800 in accordance with some embodiments of the present disclosure. In some embodiments, the method 800 can be implemented at a terminal device, such as the second terminal device 120 as shown in FIG. 1. For the purpose of discussion, the method 800 will be described with reference to FIG. 1 as performed by the second terminal device 120 without loss of generality.

At block 810, the second terminal device 120 receives from a first terminal device, control information associated with data on at least one sub-channel via a sidelink between the first terminal device and the second terminal device.

At block 820, if the second terminal device 120 successfully decodes the control information on one of the at least one sub-channel, the second terminal device 120 receives the data from the first terminal device on the at least one sub-channel.

In some embodiments, the number of the at least one frequency interlace is configured or pre-configured.

In some embodiments, additionally, the second terminal device 120 may determine the number of the at least one frequency interlace based on a size of resources in frequency domain for transmit the control information.

In some embodiments, each of the at least one sub-channel may comprise a plurality of consecutive frequency interlace.

In some embodiments, each of the at least one sub-channel may comprise a plurality of non-consecutive frequency interlace, and a gap among the at least one frequency interlace is configured or pre-configured.

In some embodiments, each of the at least one sub-channel may comprise the at least one frequency interlace in a single RB set.

In some embodiments, the second terminal device 120 may determine a first number of consecutive RB sets available for transmit the data and the control information. If a second number is a positive integer, the second terminal device 120 may select the second number of sub-channels in each of the first number of RB sets. The second number is equal to a ratio of the number of the at least one sub-channel to the first number.

In some embodiments, the control information indicates the first number and the second number.

In some embodiments, the second terminal device 120 may transmit the control information in at least one RB in a starting sub-channel in a starting RB set among the first number of consecutive RB sets, the at least one RB at least comprising a starting RB in the starting sub-channel.

In some embodiments, additionally, the second terminal device 120 may receive configuration information about the at least one sub-channel from a network device or a higher layer of the second terminal device. The second terminal device 120 may determine the at least one frequency interlace in the single RB set based on the configuration information.

In some embodiments, additionally, the second terminal device 120 may determine the at least one frequency interlace in the single RB set based on pre-configuration information.

In some embodiments, additionally, the second terminal device 120 may determine the at least one frequency interlace in the single RB set by default.

In some embodiments, additionally, in response to a success of a first type of a listen before talk process, the second terminal device 120 may determine the at least one frequency interlace in the single RB set.

In some embodiments, each of the at least one sub-channel comprises the at least one frequency interlace in a Resource Block, RB, set bundle, the RB set bundle comprising a plurality of RB sets.

In some embodiments, the number of the plurality of RB sets in the RB set bundle is configured or pre-configured.

In some embodiments, additionally, the second terminal device 120 may determine a first set of frequency interlaces in a first RB set in the RB set bundle and determine a second set of frequency interlaces in a second RB set in the RB set bundle duplicating the first set of frequency interlaces in the second RB set.

In some embodiments, additionally, the second terminal device 120 may determine the at least one frequency interlace across the plurality of RB sets in the RB set bundle in a consecutive manner.

In some embodiments, the second terminal device 120 may determine a third number of consecutive RB set bundles available for transmit the data and the control information. If a fourth number is a positive integer, the second terminal device 120 may select the fourth number of sub-channels in each of the third number of RB set bundles, the fourth number being equal to a ratio of the number of the at least one sub-channel to the third number.

In some embodiments, the control information indicates the third number and the fourth number.

In some embodiments, the second terminal device 120 may transmit the control information in at least one RB in a starting sub-channel in a starting RB set bundle among the third number of consecutive RB set bundles, the at least one RB at least comprising a starting RB in the starting sub-channel.

In some embodiments, additionally, the second terminal device 120 may receive configuration information about the at least one sub-channel from a network device or a higher layer of the second terminal device and determine the at least one frequency interlace in the RB set bundle based on the configuration information.

In some embodiments, additionally, the second terminal device 120 may determine the at least one frequency interlace in the RB set bundle based on pre-configuration information.

In some embodiments, additionally, the second terminal device 120 may receive an indication of channel occupation time from a fourth device and determine the at least one frequency interlace in the RB set bundle based on the indication.

In some embodiments, additionally, in response to a success of a second type of a listen before talk process, the second terminal device 120 may determine the at least one frequency interlace in the RB set bundle.

Figure 9:
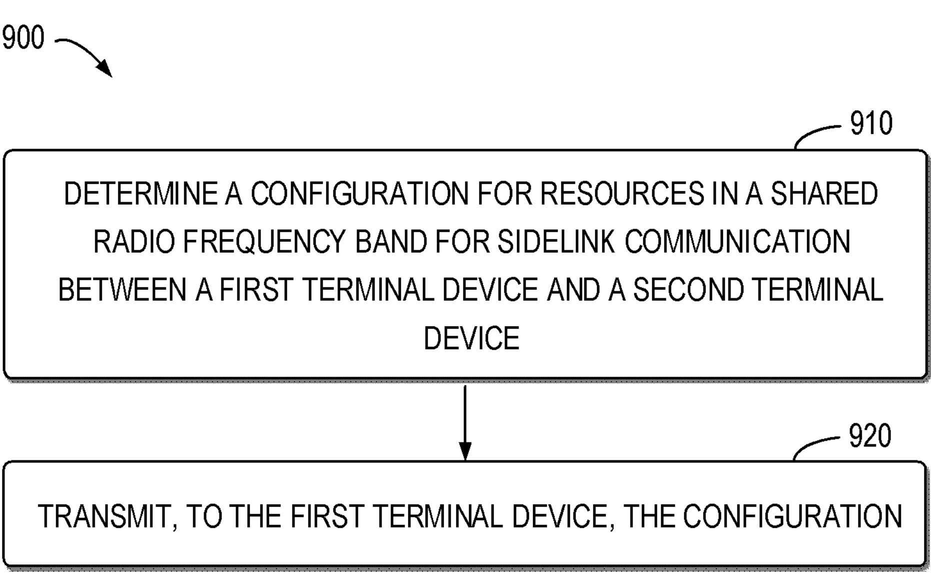
FIG. 9 illustrates a flowchart of an example method in accordance with some embodiments of the present disclosure.

FIG. 9 illustrates a flowchart of an example method 900 in accordance with some embodiments of the present disclosure. In some embodiments, the method 900 can be implemented at a network device.

At block 910, a network device determines a configuration for resources in a shared radio frequency band for sidelink communication between a first terminal device and a second terminal device. The resources comprise at least one sub-channel and each sub-channel comprises at least one frequency interlace.

At block 920, the network device transmits, to the first terminal device, the configuration.

Figure 10:
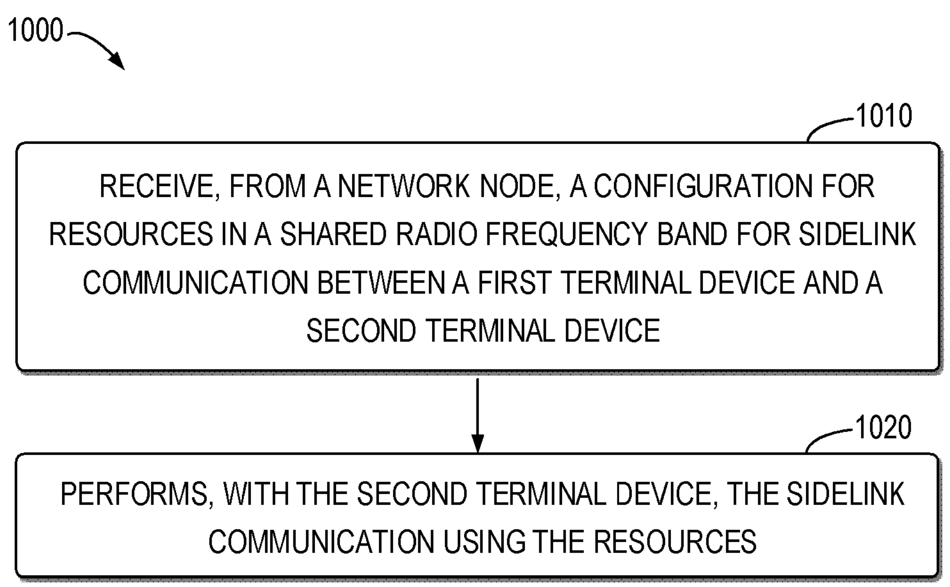
FIG. 10 illustrates a flowchart of an example method in accordance with some other embodiments of the present disclosure.

FIG. 10 illustrates a flowchart of an example method 1000 in accordance with some embodiments of the present disclosure. In some embodiments, the method 1000 can be implemented at a terminal device, such as the first terminal device 110 as shown in FIG. 1. For the purpose of discussion, the method 1000 will be described with reference to FIG. 1 as performed by the first terminal device 110 without loss of generality.

At block 1010, the first terminal device 110 receives, from a network node, a configuration for resources in a shared radio frequency band for sidelink communication between a first terminal device and a second terminal device. The resources comprises at least one sub-channel and each sub-channel comprises at least one frequency interlace.

At block 1020, the first terminal device 110 performs, with the second terminal device 120, the sidelink communication using the resources.

Figure 11:
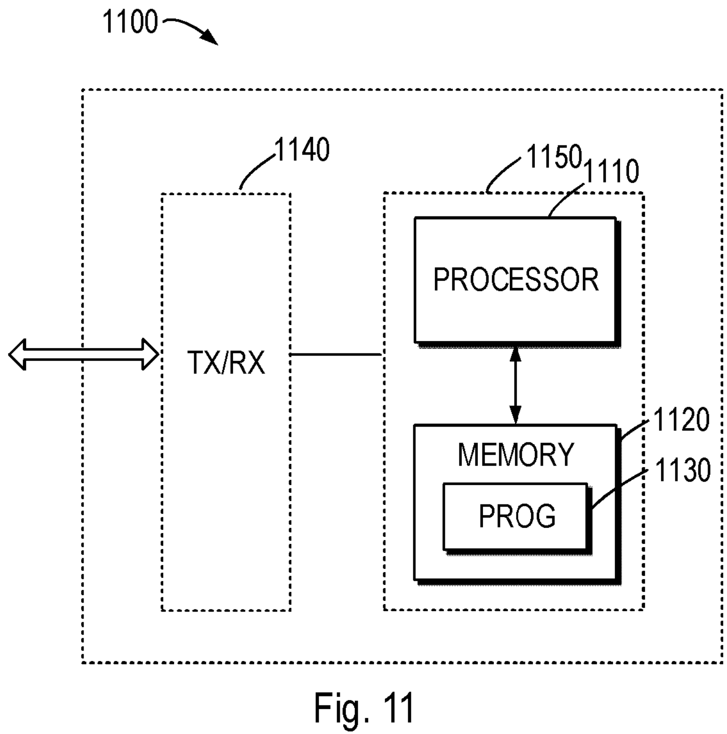
FIG. 11 is a simplified block diagram of a device that is suitable for implementing embodiments of the present disclosure.

FIG. 11 is a simplified block diagram of a device 1100 that is suitable for implementing some embodiments of the present disclosure. The device 1100 can be considered as a further example embodiment of the terminal device 110 or the terminal device 120 as shown in FIG. 1 or a network device. Accordingly, the device 1100 can be implemented at or as at least a part of the terminal device 110 or the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1120 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1130 is assumed to include program instructions that, when executed by the associated processor 1110, enable the device 1100 to operate in accordance with the embodiments of the present disclosure, as discussed herein with reference to FIGS. 2 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first user equipment (UE) communicating with a second UE via a sidelink channel, the method comprising:

receiving, from a network, a radio resource control (RRC) message comprising first information indicating a number of at least one frequency interlace per a sub-channel within a first frequency resource unit; and transmitting a first data and control information associated with the first data on the at least one sub-channel within the first frequency resource unit, each of the at least one sub-channel comprising the number of the at least one frequency interlace indicated in the first information, wherein a first index of each of the at least one sub-channel is periodically indexed across multiple resource block (RB) sets within the resource pool, and wherein each of the at least one sub-channel with the same first index is mapped to the number of the at least one frequency interlace, indicated in the first information, with the same first index in different RB sets.

2. The method according to claim 1, wherein the first frequency resource unit comprises a resource pool.

3. The method according to claim 2, wherein the resource pool comprises at least one resource block (RB) set, each of the at least one RB set comprises the at least one sub-channel, each of the at least one sub-channel comprises the at least one frequency interlace, and each of the at least one frequency interlace comprises at least one physical resource block (PRB).

4. The method according to claim 1, wherein the first frequency resource unit comprises a resource block (RB) set.

5. The method according to claim 1, wherein the first data is transmitted in physical sidelink shared channel (PSSCH), and the control information associated with the first data is transmitted in physical sidelink control channel (PSCCH).

6. The method according to claim 1, wherein each of the at least one sub-channel comprises at least one consecutive frequency interlace.

7. The method according to claim 1, wherein the transmitting the control information associated with the first data comprises:

transmitting the control information in at least one lowest physical resource block (PRB) of the sub-channel with a lowest index of a lowest resource block (RB) set of the associated first data.

8. The method according to claim 1, wherein the first index of each of the at least one sub-channel is indexed per RB set.

9. The method according to claim 1, wherein the control information comprises second information and third information, the second information indicating a first number of at least one resource block (RB) set within the resource pool, the third information indicating a second number of the at least one sub-channel in each of the first number of the at least one RB set within the resource pool.

10. A first user equipment (UE) communicating with a second UE via a sidelink channel, the first UE comprising:

one or more memories storing instructions; and one or more processors configured to process the instructions to control the first UE to:

receive, from a network, a radio resource control (RRC) message comprising first information indicating a number of at least one frequency interlace per a sub-channel within a first frequency resource unit; and transmit a first data and control information associated with the first data on the at least one sub-channel within the first frequency resource unit, each of the at least one sub-channel comprising the number of the at least one frequency interlace indicated in the first information, wherein a first index of each of the at least one sub-channel is periodically indexed across multiple resource block (RB) sets within the resource pool, and wherein each of the at least one sub-channel with the same first index is mapped to the number of the at least one frequency interlace, indicated in the first information, with the same first index in different RB sets.

11. The first UE according to claim 10, wherein the first frequency resource unit comprises a resource pool.

12. The first UE according to claim 11, wherein the resource pool comprises at least one resource block (RB) set, each of the at least one RB set comprises the at least one sub-channel, each of the at least one sub-channel comprises the at least one frequency interlace, and each of the at least one frequency interlace comprises at least one physical resource block (PRB).

13. The first UE according to claim 10, wherein the first frequency resource unit comprises a resource block (RB) set.

14. The first UE according to claim 10, wherein the first data is transmitted in physical sidelink shared channel (PSSCH), and the control information associated with the first data is transmitted in physical sidelink control channel (PSCCH).

15. The first UE according to claim 10, wherein each of the at least one sub-channel comprises at least one consecutive frequency interlace.

16. The first UE according to claim 10, wherein the one or more processors are configured to process the instructions to control the first UE to:

transmit the control information in at least one lowest physical resource block (PRB) of the sub-channel with a lowest index of a lowest resource block (RB) set of the associated first data.

17. The first UE according to claim 10, wherein the first index of each of the at least one sub-channel is indexed per RB set.

18. The first UE according to claim 10, wherein the control information comprises second information and third information, the second information indicating a first number of at least one resource block (RB) set within the resource pool, the third information indicating a second number of the at least one sub-channel in each of the first number of the at least one RB set within the resource pool.

* * * * *